US012335602B2

(12) United States Patent
Shin et al.

(10) Patent No.: US 12,335,602 B2
(45) Date of Patent: Jun. 17, 2025

(54) ELECTRONIC DEVICE INCLUDING A USER INTERFACE (UI) FOR UTILIZING A CAMERA TO TRACK AN OBJECT AND OPERATING METHOD THEREOF

(71) Applicant: Samsung Electronics Co., Ltd., Suwon-si (KR)

(72) Inventors: Hyungwoo Shin, Suwon-si (KR); Saebyuk Sheen, Suwon-si (KR); Jongwoo Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 18/303,176

(22) Filed: Apr. 19, 2023

(65) Prior Publication Data
US 2023/0262321 A1    Aug. 17, 2023

Related U.S. Application Data

(63) Continuation of application No. PCT/KR2022/000298, filed on Jan. 7, 2022.

(30) Foreign Application Priority Data

Jan. 13, 2021  (KR) ......................... 10-2021-0004720

(51) Int. Cl.
*H04N 5/335* (2011.01)
*H04N 23/45* (2023.01)
(Continued)

(52) U.S. Cl.
CPC ........... *H04N 23/632* (2023.01); *H04N 23/45* (2023.01); *H04N 23/611* (2023.01); *H04N 23/667* (2023.01); *H04N 23/69* (2023.01)

(58) Field of Classification Search
CPC .................................................... H04N 23/632
See application file for complete search history.

(56) References Cited

U.S. PATENT DOCUMENTS 8,970,764 B2   3/2015   Ryu
9,706,106 B2   7/2017   Kang et al.
(Continued)

FOREIGN PATENT DOCUMENTS

JP   2004-040205 A   2/2004
JP      6328255 B2   5/2018
(Continued)

OTHER PUBLICATIONS

International Search Report with English translation dated May 2, 2022; International Appln. No. PCT/KR2022/000298.
(Continued)

*Primary Examiner* — Gary C Vieaux
(74) *Attorney, Agent, or Firm* — Jefferson IP Law, LLP

(57) ABSTRACT

An electronic device and a method thereof are provided. The electronic device includes a display and at least one processor connected to the display. The at least one processor may display, in a first screen of the display, a first thumbnail set associated with images received from a camera group including a plurality of cameras and a preview of a first image which is one of the images. The at least one processor may identify one or more objects to be tracked from at least one of the images, may obtain one or more second images that track the one or more objects via at least one camera in the camera group, and may display, on the display, a second screen obtained by updating the first thumbnail set in the first screen with a second thumbnail set associated with the one or more second images.

20 Claims, 26 Drawing Sheets

(51) Int. Cl.
*H04N 23/611* (2023.01)
*H04N 23/63* (2023.01)
*H04N 23/667* (2023.01)
*H04N 23/69* (2023.01)

(56) References Cited

U.S. PATENT DOCUMENTS

| | | |
|---|---|---|
| 10,154,186 B2 | 12/2018 | Kang et al. |
| 10,158,807 B2 | 12/2018 | Jung et al. |
| 10,298,828 B2 | 5/2019 | Hayashi et al. |
| 10,359,891 B2 | 7/2019 | Chung et al. |
| 10,453,271 B2 | 10/2019 | Pasek |
| 10,686,990 B2 | 6/2020 | Jang |
| 10,887,554 B2 | 1/2021 | Yun et al. |
| 2010/0026721 A1* | 2/2010 | Park .................. G09G 5/14 345/660 |
| 2015/0365306 A1* | 12/2015 | Chaudhri .......... H01L 29/42324 715/753 |
| 2016/0255268 A1 | 9/2016 | Kang et al. |
| 2016/0357406 A1* | 12/2016 | Lee .................. G06V 10/17 |
| 2017/0034449 A1 | 2/2017 | Eum et al. |
| 2018/0196472 A1* | 7/2018 | Lee .................. G06F 3/0488 |
| 2020/0045240 A1 | 2/2020 | Diamond |
| 2020/0099894 A1* | 3/2020 | Yun .................. H04N 23/45 |

FOREIGN PATENT DOCUMENTS

| | | |
|---|---|---|
| KR | 10-2011-0002367 A | 1/2011 |
| KR | 10-1678861 B1 | 11/2016 |
| KR | 10-2017-0073068 A | 6/2017 |
| KR | 10-2018-0010042 A | 1/2018 |
| KR | 10-2018-0095331 A | 8/2018 |
| KR | 10-2020-0034528 A | 3/2020 |
| WO | 2014/021004 A1 | 2/2014 |

OTHER PUBLICATIONS

European Office Action dated Apr. 26, 2024, issued in European Application No. 22739585.2.

* cited by examiner

ELECTRONIC DEVICE INCLUDING A USER INTERFACE (UI) FOR UTILIZING A CAMERA TO TRACK AN OBJECT AND OPERATING METHOD THEREOF

CROSS-REFERENCE TO RELATED APPLICATION(S)

This application is a continuation application, claiming priority under § 365(c), of an International application No. PCT/KR2022/000298, filed on Jan. 7, 2022, which is based on and claims the benefit of a Korean patent application number 10-2021-0004720, filed on Jan. 13, 2021, in the Korean Intellectual Property Office, the disclosure of which is incorporated by reference herein in its entirety.

TECHNICAL FIELD

The disclosure relates to an electronic device and a method thereof. More particularly, the disclosure relates to an electronic device which implements an easy and intuitive user interface related to multiple views of a plurality of cameras, and method of the electronic device.

BACKGROUND ART

An electronic device (e.g., a smartphone, a mobile terminal, a digital camera, or a tablet) may provide various camera-based functions (e.g., a photographic function, a filtering function, an editing function, an album function, a sharing function, a video call function, or a messenger function).

A user interface (UI) (or a user experience (UX)) for effectively utilizing a camera may be required. For example, although the latest camera with high specifications is used, an application that provides an appropriate user interface or user experience may not be supported, whereby it is difficult to obtain a high-quality photographic result.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

An electronic device may use a plurality of cameras. The electronic device may provide a photographing function that uses a plurality of cameras. A user interface (or a user experience) that is easy to use and assists professional photographing using a plurality of cameras may be required.

For example, photographing may be performed in multiple directions via a plurality of cameras. A scheme of showing various photographing directions or broad areas or providing various view modes related to photographing, by providing various fields of view via a plurality of cameras may be provided.

Aspects of the disclosure are to address at least the above-mentioned problems and/or disadvantages and to provide at least the advantages described below. Accordingly, an aspect of the disclosure is to provide an electronic device which implements an easy and intuitive user interface related to multiple views of a plurality of cameras, and a method of the electronic device.

Another aspect of the disclosure is to provide an electronic device which implements various functions related to multiple views, including an automatic tracking view function, so as to increase efficiency and convenience, and a method of the electronic device.

Another aspect of the disclosure is to provide an electronic device which enables a user to capture an image by identifying various views in real time via a screen, and freely changing to a desired view.

Solution to Problem

In accordance with an aspect of the disclosure, an electronic device is provided. The electronic device includes a display, and at least one processor connected to the display. The at least one processor may be configured to display, on a first screen of the display, a first thumbnail set associated with images received from a camera group including a plurality of cameras and the preview of a first image which is one of the images, to identify one or more objects to be tracked from at least one of the images, to obtain one or more second images that track the one or more objects via at least one camera in the camera group, and to display, on the display, a second screen obtained by updating the first thumbnail set in the first screen with a second thumbnail set associated with the one or more second images.

In accordance with another aspect of the disclosure, a method of operating an electronic device is provided. The method includes an operation of displaying, in a first screen, a first thumbnail set associated with images received from a camera group including a plurality of cameras and a preview of a first image which is one of the images, an operation of sensing one or more objects to be tracked from at least one of the images, an operation of obtaining one or more second images that track the one or more objects via at least one camera in the camera group, and an operation of displaying a second screen obtained by updating the first thumbnail set in the first screen with a second thumbnail set associated with the one or more second images.

Advantageous Effects of Invention

According to various embodiments of the disclosure, an easy and intuitive user interface related to multiple views via a plurality of cameras may be embodied.

According to various embodiments of the disclosure, various functions related to multiple views including an automatic tracking view function may be embodied so that efficiency and convenience can be increased.

According to various embodiments of the disclosure, a user can capture an image by seeing various views in real time via a screen, and freely changing to a desired view.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

BEST MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
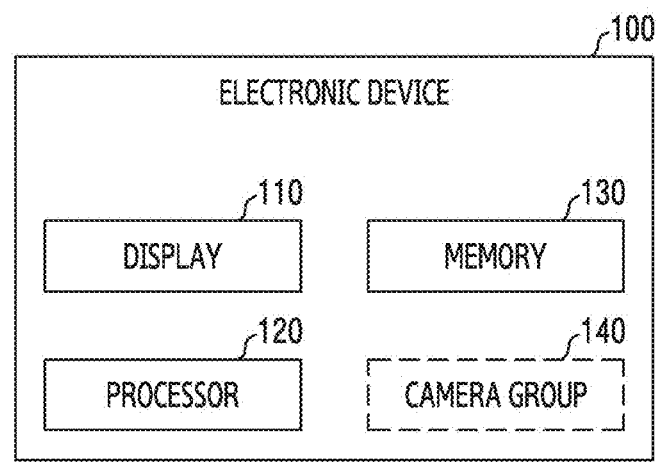
FIG. 1 is a block diagram illustrating an electronic device according to an embodiment of the disclosure.

FIG. 1 is a block diagram illustrating an electronic device according to an embodiment of the disclosure.

Referring to FIG. 1, an electronic device 100 according to an embodiment may include a display 110, a processor 120, and a memory 130.

The electronic device 100 according to an embodiment may further include a camera group 140. The camera group 140 may include a plurality of cameras. For example, the cameras of the camera group 140 may be all the cameras (e.g., local cameras) included in the electronic device 100. As another example, some of the cameras of the camera group 140 may be included in the electronic device 100, and some other cameras may be external cameras (e.g., cloud cameras) and may be interoperated with the electronic device 100.

The display 110, the processor 120, the memory 130, and the camera group 140 may be electrically and/or operatively connected to each other, and may exchange signals (e.g., commands or data) therebetween.

The electronic device 100 may include at least part of an electronic device 2301 which will be described later with reference to FIG. 23. For example, the display 110 may correspond to a display module 2360 of FIG. 23. The processor 120 may correspond to a processor (one of processors 2320, 2321, or 2323) of FIG. 23.

The processor 120 may include at least one processor. For example, the processor 120 may include at least one of an application processor (AP) (e.g., a main processor 2321), an image signal processor (ISP) (e.g., an image signal processor 2360), a communication processor (CP) (e.g., an auxiliary processor 2323).

The camera group 140 may include a plurality of cameras. Each camera may correspond to a camera module 2380 of FIG. 22, or may include at least part (e.g., a lens assembly 2210, a flash 2220) of the camera module 2380.

According to an embodiment of the disclosure, the plurality of cameras may have different fields of view (FOV) or different photographing directions. For example, the camera group 140 may include a front camera and a back camera of which the photographing directions are different from each other. The front camera may be a selfie camera for taking a selfie. For example, the camera group 140 may include a first back camera, a second back camera, and a third back camera of which the fields of view are different from each other. The first back camera may be a camera (an ultra-wide-angle camera) for ultra-wide photographing. The second back camera may be a camera (a wide-angle camera) for wide photographing. The third back camera may be a camera (e.g., a telecamera) for tele-photographing. Here, if the fields of view of the first back camera, the second back camera, and the third back camera are θ1, θ2, and θ3, 'θ1>θ2>θ3' may be satisfied.

Each camera in the camera group 140 may capture an image (a still image, for example, a picture) and/or may record a video. The captured image and/or video may be stored in the memory 130. Hereinafter, the captured image and/or video may be referred to as a photographic content.

The processor 120 may control the camera group 140. The processor 120 may support various functions using the camera group 140. The processor 120 may control the camera group 140 so as to obtain a photographic content from the camera group 140. The processor 120 may store, in the memory 130, a photographic content obtained via the camera group 140 or may process the same in real time. The processor 120 may control the display 110. The processor 120 may display a photographic content via the display 110. For example, while an application (e.g., a camera application or a photographing application) is executed, a photographic content may be displayed in an application execution screen.

The processor 120 may execute code written in a programing language stored in the memory 130 of the electronic device 100 so as to execute an application and to control various pieces of hardware. For example, the processor 120 may execute an application (e.g., a camera application or a photographing application), and may display a photographic content or a user interface (UI) related to the photographic content in an application execution screen. When instructions stored in the memory 130 are executed, the processor 120 may perform operations.

The processor 120 may provide a view, a preview, a thumbnail view, a multi-view, a storage function, a processing function, and/or a management function in association with a photographic content obtained via the camera group 140. A photographic content may be processed in real time, or may be processed after being stored in the memory 130.

The processor 120 may provide various functions using a plurality of cameras included in the camera group 140. For example, the processor 120 may provide a photographing function using the camera group 140, a storage function, or a function that supports viewing of a photographic content to a user or processing of a photographic content. For example, the processor 120 may provide one or more functions among an automatic tracking view function, a multi-view and recording function, and/or a view control function. The multi-view and recording function may be a function of viewing images received from a plurality of cameras (e.g., the same types of cameras or different types of cameras having different specifications) in the form of multiple views in one screen, or a function of capturing an image using a plurality of cameras. For example, when photographing is performed, a plurality of images may be stored simultaneously or may be stored after being combined to be a single image. The multi-view and recording function may be a function of viewing images received from a plurality of cameras having different photographing directions or different fields of view in the form of multiple views, or a function of capturing an image using the plurality of cameras. For example, an image may be captured simultaneously using a wide-angle camera and a telecamera. The automatic tracking view function may be a function of viewing a tracked image on a screen by performing automatic tracking of a predetermined object, or a function of capturing the image. The view control function may be a function of controlling (e.g., extending, changing, hiding, showing, or customizing) a view that shows a photographic content on a screen.

According to an embodiment of the disclosure, the processor 120 may provide a multi-view function.

The processor 120 may display a first screen (e.g., a screen 500 and 520 of FIG. 5A, a screen 502 and 522 of FIG. 5B) via the display 110. The first screen may include a main view area. The preview of a first image (e.g., a main preview image) which is one of the images received from the camera group 140 including a plurality of cameras may be displayed in the main view area. The first screen may further include a first thumbnail set associated with the received images. The first thumbnail set may be a basic thumbnail set. The first thumbnail set may include one or more thumbnail views. For example, if the camera group 140 includes a front camera, a first back camera, a second back camera, and a third back camera, the first thumbnail set may include at least one of the thumbnail view (a front view) of an image received from the front camera, the thumbnail view (an ultra-wide-angle back view) of a first image received from the first back camera, the thumbnail view (a wide-angle back view) of a second image received from the second back camera, and the thumbnail view (a telephotographic back view) of a third image received from the third back camera. The preview of one of the image from the front camera, the first image, the second image, and the third image may be displayed in the main view area of the first screen as a main preview image. A thumbnail set including the thumbnail views of one or more images among the image from the front camera, the first image, the second image, and the third image may be displayed in the first screen.

According to an embodiment of the disclosure, the processor 120 may provide an automatic tracking view function.

The processor 120 may identify one or more objects to track from at least one of the images received from the camera group 140. For example, the processor 120 may identify an object(s) to track from a first image (e.g., a main preview image) which is one of the received images. As another example, the processor 120 may identify an object(s) to track from some of the images (e.g., the main preview image, some of the thumbnail images). As another example, the processor 120 may identify an object(s) to track from all of the images (e.g., the main preview image, all thumbnail images) that are being displayed on a screen.

For example, based on one or more among a motion, a gesture, a sound, or a face (e.g., a motion, a gesture, a sound or a face in a main preview image), one or more objects to be tracked may be detected (or automatically sensed). If fields of view of a plurality of cameras in the camera group 140 are different from each other, the first image may be obtained from a camera (e.g., an ultra-wide-angle camera) having the broadest field of view among the plurality of cameras. As another example, one or more objects to be tracked may be detected based on a user input (e.g., a touch to a predetermined object in the main preview image).

The processor 120 may obtain one or more second images which track one or more objects via at least one camera in the camera group 140.

The processor 120 may display, on the display 110, a second screen (e.g., a screen 540 of FIG. 5A, a screen 542 of FIG. 5B) in which the first thumbnail set is updated with a second thumbnail set associated with the one or more second images. The second thumbnail set may be an updated thumbnail set. The second thumbnail set may include one or more automatic tracking views. When the first thumbnail set is updated with the second thumbnail set, at least some of the thumbnail views in the first thumbnail set may be changed or a new thumbnail view may be added.

A plurality of thumbnail views in the second thumbnail set may be displayed to match one or more objects to be tracked in one-to-one correspondence. For example, when two persons are detected as objects to be tracked from the main preview image of the first screen, two thumbnail views that respectively track the two persons may be included in the second thumbnail set and may be displayed in the second screen.

When a second object (e.g., person 3) to be tracked is additionally detected from at least one of the images received from the camera group 140, a thumbnail view associated with the second object may be added to the second thumbnail set.

According to a user input to a predetermined thumbnail view in the second thumbnail set, an object to be tracked via the predetermined thumbnail view may be changed. The object to be tracked via the predetermined thumbnail view may be changed from a first object (e.g., person 1) to a second object (e.g., person 2), or may be changed from a first part (e.g., a face) of one object (e.g., person 1) to a second part (e.g., a hand). An indicator indicating an object to which the existing object is changed may be displayed in the main view area of the second screen.

When a predetermined object to be tracked is detected according to a user input to the first image (e.g., the main preview image), thumbnail views that track the predetermined object with different zooming rates respectively via the plurality of cameras in the camera group 140 may be displayed in the second thumbnail set in the second screen. In response to the user input, as many thumbnail views as the number of cameras included in the camera group 140 may be added to the second thumbnail set at once.

According to an embodiment of the disclosure, the processor 120 may provide multiple views including an automatic tracking view, and may provide a multi-recording function using the multiple views. The multi-view and recording function may be a function that supports capturing of an image by identifying views with various fields of view or various types of views (e.g., an ultra-wide-angle view, a wide-angle view, a telephotographic view, and/or an automatic tracking view) via a screen in real time, and freely changing to a desired view. Various views of a plurality of images obtained using the camera group 140 may be freely changed and shown in a screen according to a user input. After a plurality of images are captured, the plurality of images may be stored (recorded) in the memory 130, respectively, or by being combined to be a single image.

According to an embodiment of the disclosure, the processor 120 may provide a function of controlling (e.g., extending, changing, hiding, showing, or customizing) a view in association with a camera view in a screen.

For example, an icon for adding a thumbnail view to or deleting a thumbnail view from the first thumbnail set (or a basic thumbnail set) or the second thumbnail view (or an updated thumbnail set) may be provided. According to a user input, the order of display of the thumbnail views in the first thumbnail set or the second thumbnail set may be changed.

According to various embodiments of the disclosure, an area, an icon, an indicator, a menu, a handler, and the like are illustrated as a user interface or an element in a screen, the element may also be expressed as another term, such as a button, a functional button, a user interface element, a graphic element, or a visual element. The illustrated user interface or the element of the screen is merely an example, and the layout, disposition, or the number of elements may be variously modified, changed, or applicated.

The location of display of the first thumbnail set or the second thumbnail set may be moved according to a user input. For example, the first thumbnail set or the second thumbnail set may be moved to be displayed in a location deviated from a main subject in the main view area, or an indicator indicating the movement may be displayed.

When a user input that requests a correction effect is present, a third thumbnail set obtained by applying the correction effect to a plurality of thumbnail views all together in the first thumbnail set or the second thumbnail set may be additionally displayed.

Figure 2A:
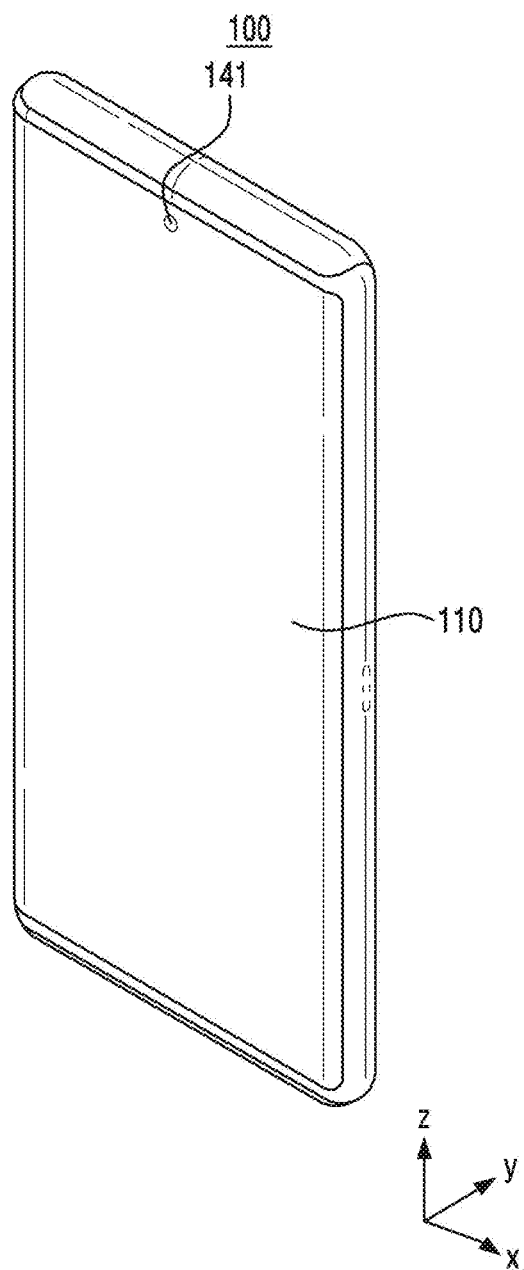
FIG. 2A is a front perspective view of a mechanical structure of an electronic device according to an embodiment of the disclosure.
Figure 2B:
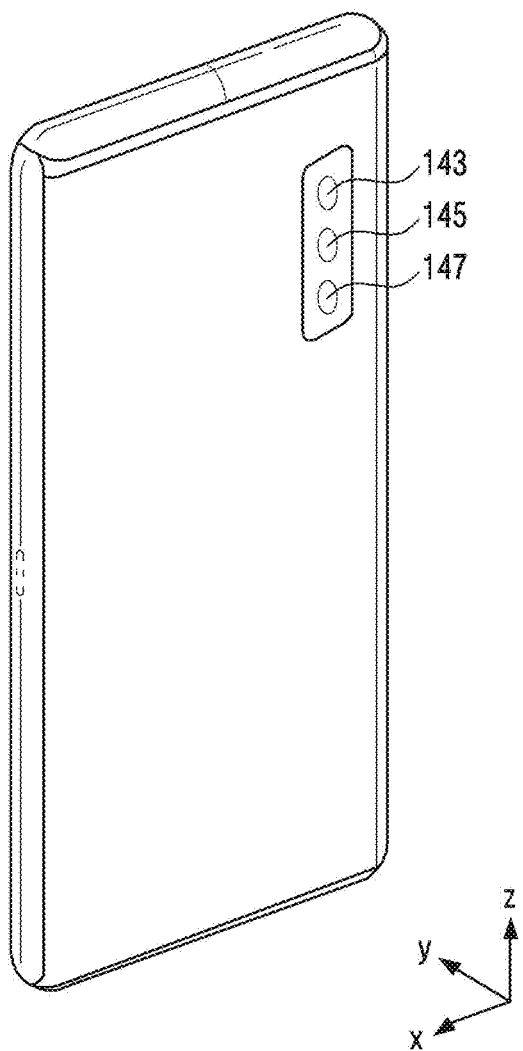
FIG. 2B is a back perspective view of a mechanical structure of an electronic device according to an embodiment of the disclosure.

FIGS. 2A and 2B are diagrams illustrating a mechanical structure of an electronic device according to various embodiments of the disclosure.

Referring to FIGS. 2A and 2B together, the electronic device 100 according to an embodiment may include the display 110 and the camera group 140. The display 110 may be disposed in the front side of the electronic device 100. The display 110 may occupy the entirety of the front side area of the electronic device 100.

One or more cameras may be included in the camera group 140.

According to an embodiment of FIGS. 2A and 2B, the camera group 140 may include a front camera 141 or back cameras 143, 145, and 147. One or more front cameras 141 may be disposed in the front side of the electronic device 100. One or more back cameras 143, 145, and 147 may be disposed in the back side of the electronic device 100.

Figure 22:
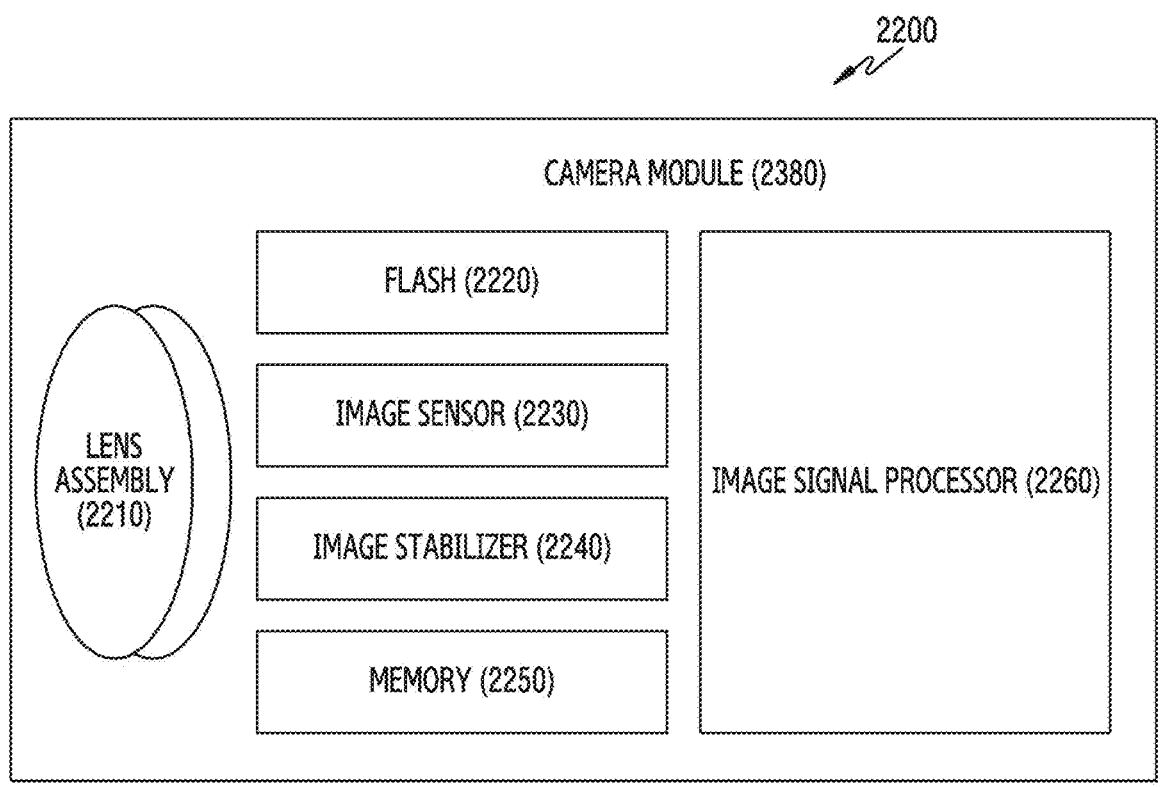
FIG. 22 is a block diagram illustrating a camera module according to an embodiment of the disclosure.

For example, each camera in the camera group 140 may correspond to a camera module 2380 of FIG. 22, or may include at least part (e.g., a lens assembly 2210, a flash 2220) of the camera module 2380. A part of the camera may be embodied in an integrated form. For example, each camera includes only some elements (e.g., the lens assembly 2210), and other elements (e.g., an image sensor 2230 or an image signal processor 2260) may be integrated into a single entity.

The illustrated configuration of the camera group 140 is merely an example and the scope of embodiments are not limited thereto. For example, in the embodiments of FIGS. 2A and 2B, although the single front camera 141 and three back cameras 143, 145, and 147 are illustrated, various modifications, applications, or extensions may be possible in association with the camera group 140 or the configuration of each camera (e.g., a location, the number of cameras, a mechanical configuration). For example, the number of back cameras may be changed, or a plurality of (e.g., 2) front cameras may be included. Alternatively, only one of a front camera or a back camera may be configured. Alternatively, an external camera (not illustrated, e.g., a cloud camera), as opposed to a camera included in the electronic device 100, may be solely used or may be used together with the camera of the electronic device 100.

In an embodiment of the disclosure, the electronic device 100 may include a single front camera 141 and a plurality of back (e.g., three) cameras 143, 145, and 147.

The single front camera 141 may be disposed in the front side of the electronic device 100. For example, the front camera 141 may be a selfie camera for taking a selfie. For example, the front camera 141 may be a camera having specifications (e.g., pixels) same as one of the back cameras 143, 145, and 147, and of a type same as the one. As another example, the front camera 141 may be a camera which has specifications lower than those of the back cameras 143, 145, and 147.

One or more back cameras 143, 145, and 147 may be disposed in the back side of the electronic device 100. The electronic device 100 may include the plurality of back cameras 143, 145, and 147.

For example, the camera group 140 may include a first back camera, a second back camera, and a third back camera. The first back camera, the second back camera, and the third back camera may have specifications different from each other. One or more among the field of view, the pixels, or the aperture of each back camera, or the type or the disposition of a lens set included in each camera may be different from each other. For example, the camera group 140 may include a first back camera, a second back camera, and a third back camera of which the fields of view are different from each other. The first back camera may be a camera (an ultra-wide-angle camera) for ultra-wide photographing. The second back camera may be a camera (a wide-angle camera) for wide photographing. The third back camera may be a camera (a telecamera) for tele-photographing.

The mechanical structure of the electronic device 100 illustrated in FIGS. 2A and 2B is merely an example, and the scope of embodiments are not limited to a predetermined structure or type, and various modifications, applications, or extensions are possible. For example, an electronic device according to an embodiment may be any one of a flexible type (e.g., a foldable type, a slidable type, or rollable type) of electronic device (e.g., a smartphone), a digital camera, a wearable device, a tablet, or a laptop.

A method, according to various embodiments of the disclosure, may be performed by an electronic device (e.g., the electronic device 100 or the processor 120). For ease of description, although an operation subject that performs each operation is assumed to be the electronic device 100 or the processor 120 of FIG. 1, it is not limited thereto. For example, the image signal processor 2260 of FIG. 22 may be the subject of operation, or two or more subjects (e.g., the processor 120 and the image signal processor 2260) may interoperate for operation.

In the embodiments provided hereinafter, operations may be performed sequentially, but it is not necessarily. For example, the order of operations may be changed, and at least two operations may be performed in parallel. At least one of the operations may be omitted, the order of some operations may be changed, or another operation may be added.

Figure 3:
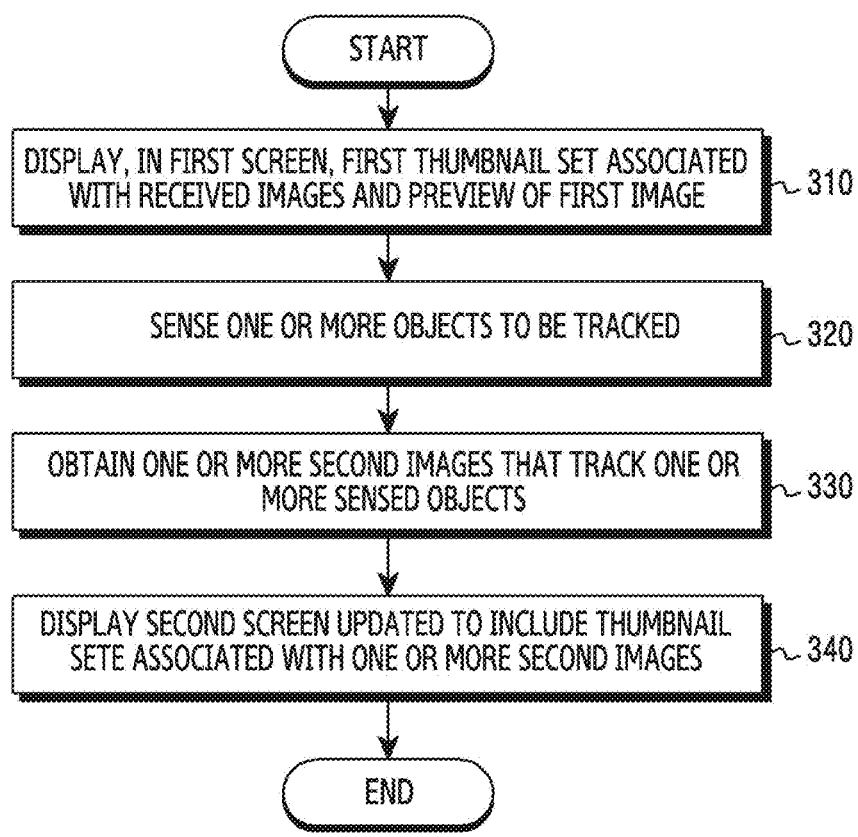
FIG. 3 is a flowchart illustrating a method of operating an electronic device according to an embodiment of the disclosure.

FIG. 3 is a flowchart illustrating a method of operating an electronic device according to an embodiment of the disclosure.

Referring to FIG. 3, a method of operating an electronic device according to an embodiment may include operation 310, operation 320, operation 330, and operation 340. For ease of description, it is assumed that the method of FIG. 3 is performed by the processor 120 of the electronic device 100.

In operation 310, the processor 120 of the electronic device 100 may display a first screen (e.g., the screen 500 and 520 of FIG. 5A, the screen 502 and 522 of FIG. 5B) via the display 110. The first screen may include a main view area. The preview of the first image (e.g., the main preview image) which is one of the images received from the camera group 140 including a plurality of cameras may be displayed in the main view area. The first screen may further include a first thumbnail set associated with the received images.

The first thumbnail set may be a basic thumbnail set. The first thumbnail set may include one or more thumbnail views. For example, if the camera group 140 includes a front camera, a first back camera, a second back camera, and a third back camera, the first thumbnail set may include at least one of the thumbnail view (a front view) of an image received from the front camera, the thumbnail view (an ultra-wide-angle back view) of a first image received from the first back camera, the thumbnail view (a wide-angle back view) of a second image received from the second back camera, and the thumbnail view (a telephotographic back view) of a third image received from the third back camera. The preview of one of the image from the front camera, the first image, the second image, and the third image may be displayed in the main view area of the first screen as a main preview image. A thumbnail set including thumbnail views of one or more images among the image from the front camera, the first image, the second image, and the third image may be displayed in the first screen.

In operation 320, the processor 120 may identify one or more objects to track from at least one of the images received in operation 310. For example, the processor 120 may identify an object(s) to track from a first image (e.g., a main preview image) which is one of the received images. As another example, the processor 120 may identify an object(s) to track from some of the images (e.g., the main preview image, some of the thumbnail images). As another example, the processor 120 may identify an object(s) to track from all of the images (e.g., the main preview image, all thumbnail images) being displayed on a screen.

For example, based on one or more among a motion, a gesture, a sound, or a face (e.g., a motion, a gesture, a sound, or a face in the first image which is the main preview image), one or more objects to be tracked may be sensed. If fields of view of the plurality of cameras in the camera group 140 are different from each other, the first image may be obtained from a camera (e.g., an ultra-wide-angle camera) having the broadest field of view among the plurality of cameras. As another example, one or more objects to be tracked may be detected based on a user input (e.g., a touch to a predetermined object in the main preview image).

For example, an image analysis (e.g., image frame recognition, key points detection, semantic segmentation, or sound processing) which is previously defined for sensing an object to be tracked in an image may be used.

In operation 330, the processor 120 may obtain one or more second images which track the one or more objects via at least one camera among the plurality of cameras in the camera group 140.

In operation 340, the processor 120 may display, on the display 110, a second screen (e.g., the screen 540 of FIG. 5A, the screen 542 of FIG. 5B) in which the first thumbnail set is updated with a second thumbnail set associated with the one or more second images. The first screen may be updated with the second screen. The first thumbnail set (or a basic thumbnail set) in the first screen may be updated with the second thumbnail set (or an updated thumbnail set) in the second screen.

The second thumbnail set may include one or more automatic tracking views. When the first thumbnail set is updated with the second thumbnail set, at least some of the thumbnail views in the first thumbnail set may be changed or a new thumbnail view may be added.

A plurality of thumbnail views in the second thumbnail set may be displayed to match one or more objects to be tracked in one-to-one correspondence. For example, when two persons are detected as objects to be tracked from the main preview image of the first screen, two thumbnail views that respectively track the two persons may be included in the second thumbnail and may be displayed in the second screen.

When a second object (e.g., person 3) to be tracked is additionally detected from at least one of the images received from the camera group 140, a thumbnail view associated with the second object may be added to the second thumbnail set.

According to a user input to a predetermined thumbnail view in the second thumbnail set, an object to be tracked via the predetermined thumbnail view may be changed. The object to be tracked via the predetermined thumbnail view may be changed from a first object (e.g., person 1) to a second object (e.g., person 2), or may be changed from a first part (e.g., a face) of one object (e.g., person 1) to a second part (e.g., a hand). An indicator indicating an object to which the existing object is changed may be displayed in the main view area of the second screen.

When a predetermined object to be tracked is detected according to a user input to the first image (e.g., the main preview image), thumbnail views that track the predetermined object with different zooming rates respectively via the plurality of cameras in the camera group 140 may be displayed in the second thumbnail set in the second screen. In response to the user input, as many thumbnail views as the number of cameras included in the camera group 140 may be added to the second thumbnail set at once.

The electronic device 100 (or the processor 120) may provide various functions using the plurality of cameras included in the camera group 140. For example, the electronic device 100 may provide one or more functions among a multi-view and recording function, an automatic tracking view function, a view extension function, a view change function, a view hiding function/showing function, and/or a view customizing function.

Hereinafter, each function of an electronic device (e.g., the electronic device 100) according to an embodiment will be described with reference to FIGS. 4, 5A, 5B, 6 to 9, 10A, 10B, and 11 to 21.

Figure 4:
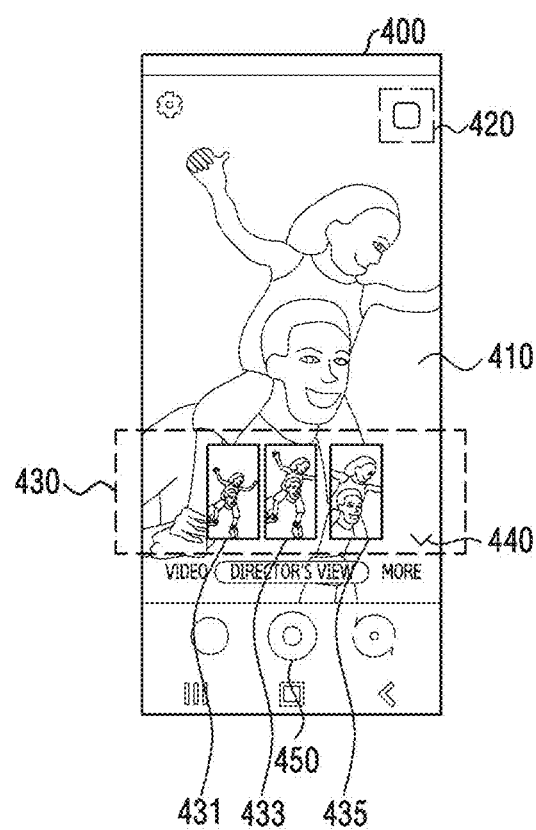
FIG. 4 is a diagram illustrating a screen related to a multi-view and recording function in an electronic device according to an embodiment of the disclosure.

FIG. 4 is a diagram illustrating a screen related to a multi-view and recording function in an electronic device according to an embodiment of the disclosure.

The multi-view and recording function may be a function that supports capturing of an image by identifying views of various fields of view or various types of views (e.g., an ultra-wide-angle view, a wide-angle view, a telephotographic view, and/or an automatic tracking view) via a screen in real time, and freely changing to a desired view. Various views of a plurality of images obtained using the camera group 140 may be freely changed and shown on a screen according to a user input. After a plurality of images having different fields of view or different types of a plurality of images are captured, the images may be stored (recorded), respectively, or by being combined to be a single image.

Referring to FIG. 4, a diagram 400 illustrates a screen including a thumbnail set (or a basic thumbnail set) including views with various fields of view (e.g., an ultra-wide angle view, a wide-angle view, and/or a telephotographic view).

The screen 400 may include a main view area 410 and a thumbnail set 430. A handler 440 for a hiding function/showing function of the thumbnail set 430 may be disposed in the screen 400. The screen 400 may further include a toggle icon 420 and a photographing icon 450.

The preview (or the main preview) of an image among the images received from the plurality of cameras in the camera group 140 may be displayed in the main view area 410.

A thumbnail set associated with the images received from the plurality of cameras in the camera group 140 may be displayed in the thumbnail set 430. For example, if a first camera (e.g., an ultra-wide angle camera), a second camera (e.g., a wide-angle camera), and a third camera (e.g., a telecamera) are included in the camera group 140, a first thumbnail view 431 (e.g., an ultra-wide angle view) associated with an image from the first camera, a second thumbnail view 433 (e.g., a wide-angle view) associated with an image from the second camera, a third thumbnail view 435 (e.g., a telephotographic view) associated with an image from the third camera may be displayed in the thumbnail set 430.

According to a user input (e.g., a touch, a tap) to the thumbnail set 430, an image displayed in the main view area 410 may be changed. For example, if the second thumbnail view 433 is selected from the thumbnail set 430 while the image from the first camera is displayed in the main view area 410, the image (or the main preview image) displayed in the main view area 410 may be changed from the image from the first camera to the image from the second camera.

According to a user input, a hiding function or a showing function may be applied to the thumbnail set 430. For example, according to a touch to the handler 440 or a swipe up/down input to the thumbnail set 430, the thumbnail set 430 may disappear from or appear on the screen.

Although FIG. 4 illustrates the case in which a single image is displayed in the main view area 410, a plurality of images received from a plurality of cameras (e.g., cameras having different fields of view) in the camera group 140 may be displayed in the main view area 410. For example, an image from the first camera may be displayed in the main view area 410 in the form of a single view. As another example, an image from the first camera and an image from the second camera may be displayed in one screen (or simultaneously) in the form of a dual picture in picture (PIP) view or in the form of a dual split view.

The toggle icon 420 may be an icon (or a functional button or a visual element) for selecting one of the three modes including a single view, a dual PIP view, a dual split view. For example, in the state in which the first image is displayed in the main view area 410 in the form of a single view, if the toggle icon 420 is touched, the single view may be changed to the dual PIP view. In this instance, if the toggle icon 420 is touched again, the dual PIP view may be changed to the dual split view. In this instance, if the toggle icon 420 is touched again, the dual split view returns to the single view. In the case of switching (or changing) a mode to the dual PIP view or the dual split view, a first image and a second image may be selected among the images received from the camera group 140 and may be displayed in one screen (or simultaneously) via the main view area 410.

The photographing icon 450 may be an icon (or a functional button or a visual element) for capturing an image. For example, if the photographing icon 450 is touched, the photographing icon 450 is changed from a default state to an activated state, and capturing one or a plurality of images which are being displayed in the main view area 410 may be started. If the photographing icon 450 is touched again, the photographing icon 450 may be changed from the activated state to the default state, the capturing is terminated, and a captured image(s) may be stored. For example, a plurality of images captured with various fields of view may be stored (or recorded), respectively, or after being combined to be a single image.

Figure 5A:
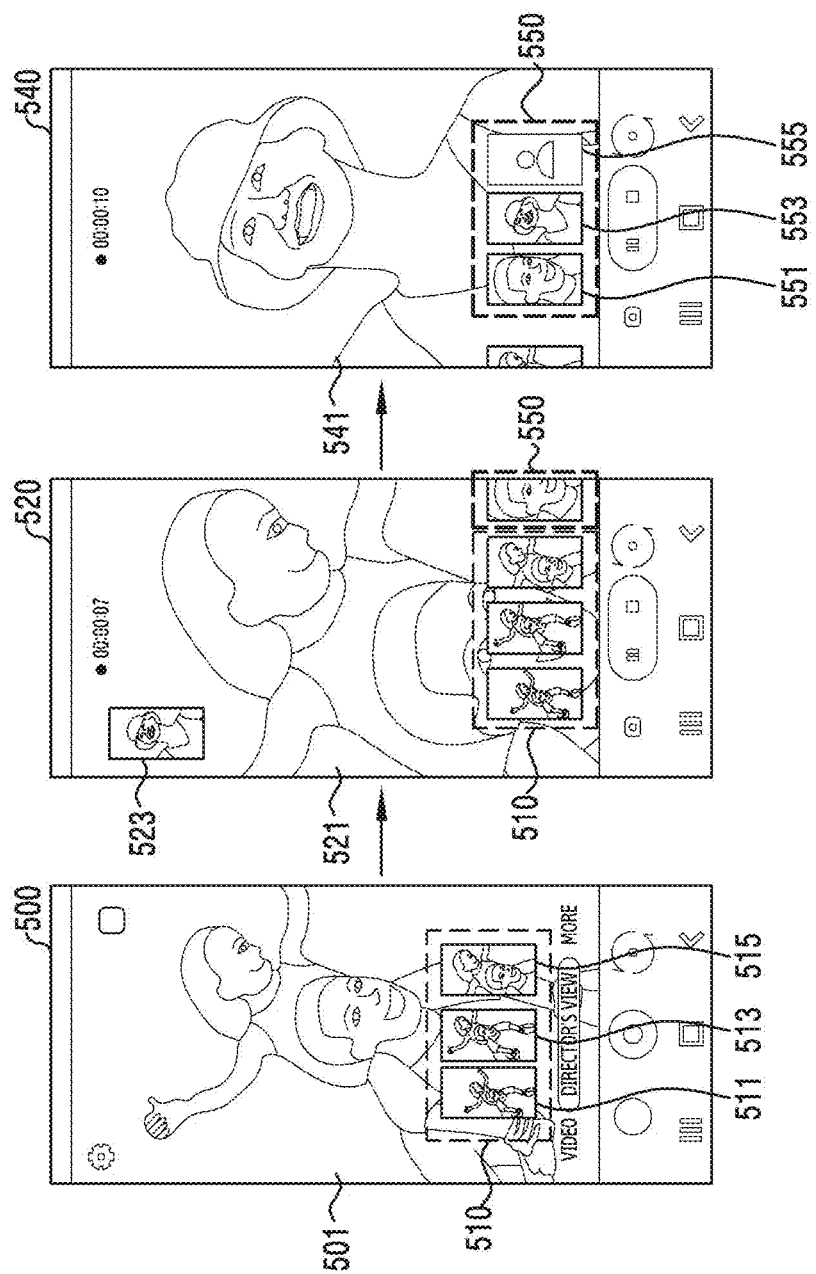
FIG. 5A is a diagram illustrating a user interface related to a multi-view and recording function of an electronic device according to an embodiment of the disclosure.

FIG. 5A is a diagram illustrating a user interface related to a multi-view and recording function of an electronic device according to an embodiment of the disclosure.

FIG. 5A illustrates the case in which objects to be tracked are detected from thumbnail images of a first thumbnail set 510 (or a basic thumbnail set) and the main preview image in a main view area 501 in a first screen 500, and a second thumbnail set 550 (or an updated thumbnail set) which is updated to include the thumbnail view (automatic tracking view) of each object is displayed in a third screen 540.

Referring to FIG. 5A, diagrams 500, 520, and 540 illustrate screens which are sequentially switched according to a user input. The screens 500, 520, and 540 of the electronic device 100 may include thumbnail sets 510 and 550 including views with various fields of view or various types of views (e.g., an ultra-wide angle view, a wide-angle view, a telephotographic view and/or an automatic tracking view).

The first screen 500 may correspond to the screen 400 of FIG. 4. For example, while an application (e.g., a camera application or a photographing application) is executed, a user interface, such as the first screen 500 may be output to the display 110 of the electronic device 100.

The first screen 500 may include the main view area 501 and the first thumbnail set 510. The first thumbnail set 510 may be a basic thumbnail set. The first thumbnail set 510 may include views with various fields of view. For example, the first thumbnail set 510 may include a first thumbnail view 511 (e.g., an ultra-wide angle view), a second thumbnail view 513 (e.g., a wide-angle view), and a third thumbnail view 515 (e.g., a telephotographic view). In the first thumbnail view 511, the thumbnail of an image received from a first back camera (e.g., an ultra-wide angle camera) may be displayed. In the second thumbnail view 513, the thumbnail of an image received from a second back camera (e.g., a wide angle camera) may be displayed. In the third thumbnail view 515, the thumbnail of an image received from a third back camera (e.g., a telecamera) may be displayed.

A main preview image which is one of the images received from a plurality of cameras in the camera group 140 may be displayed in the main view area 501. The thumbnail view (e.g., the first thumbnail view 511) associated with the main preview image may be included in the first thumbnail set 510.

According to a user input (e.g., a touch, a tap) to the first thumbnail set 510, an image displayed in the main view area 501 may be changed. For example, if the third thumbnail view 515 is selected (touched) from the thumbnail set 510 while the image from the first back camera is displayed in the main view area 501, the image (or the main preview image) displayed in the main view area 501 may be changed from the image from the first back camera to the image from the third back camera.

When the third thumbnail view 515 is selected, the first screen 500 may be changed to the second screen 520.

The second screen 520 may include the main view area 521, the first thumbnail set 510, and an additional thumbnail view 523. A part of the second thumbnail set 550 may appear close to the first thumbnail set 510. For example, the image from the third camera may be displayed in the main view area 521 of the second screen 520. In the same manner as the first screen 500, thumbnail views respectively corresponding to the three back cameras may be included in the first thumbnail set 510 in the second screen 520. In the additional thumbnail view 523, an image from a front camera may be displayed as a thumbnail.

A part of the second thumbnail set 550 may appear in the second screen 520. For example, when automatic tracking is started, a part of the second thumbnail set 550 may appear in an edge area beside the first thumbnail set 510.

One or more objects to be tracked may be detected from the main preview image and/or thumbnail image displayed in the main view area 521. The thumbnail image may be an image that is being displayed in the first thumbnail set 510 or the additional thumbnail view 523. For example, based on one or more among a motion, a gesture, a sound, or a face in a main preview image and/or a thumbnail image, automatic tracking may be performed or an object to be tracked may be sensed. As another example, according to a user input (e.g., a touch interaction associated with a predetermined object in a screen), automatic tracking may be performed or an object to be tracked may be sensed.

According to a user input (e.g., a touch, a tap) to the second screen 520, an image displayed in the main view area 521 in the second screen 520 may be changed. For example, if the additional thumbnail view 523 that is displaying an image from the front camera is selected (e.g., touched) while the image from the third back camera is displayed in the main view area 521, the image (or the main preview image) displayed in the main view area 521 may be changed from the image from the third back camera to the image from the front camera.

When the main preview image is changed from the image from the third back camera to the image from the front camera, and automatic tracking is performed (or a user input is input), the second screen 520 may be changed to the third screen 540. For example, when automatic tracking is started, the first thumbnail set 510 may be automatically updated with (or changed to) the second thumbnail set 550. As another example, according to a swipe input (e.g., a swipe to the right) to a thumbnail area (e.g., an area where the first thumbnail set 510 and the second thumbnail set 550 are displayed) in the second screen 520, the first thumbnail set 510 may be updated with (or switched to) the second thumbnail set 550. Alternatively, according to a swipe input (e.g., a swipe to the left), the second thumbnail set 550 may be updated with (or switched to) the first thumbnail set 510 again.

The third screen 540 may include a main view area 541 and the second thumbnail set 550.

The first thumbnail set 510 may be updated with the second thumbnail set 550. The second thumbnail set 550 may include one or more thumbnail views 551, 553, and 555. The number of thumbnail views in the second thumbnail set 550 may correspond to the number of objects to be tracked.

The third screen 540 corresponds to the case in which a plurality of persons which are objects to be tracked are detected from the main preview image and/or thumbnail image of the second screen 520, which is a previous screen, and the thumbnail view 551 and 553 of each person is provided in the second thumbnail set 550. The second thumbnail set 550 may include a first thumbnail view 551 of a first object to be tracked (e.g., a father) and a second thumbnail view 553 of a second object to be tracked (e.g., a mother). The second thumbnail set 550 may further include a third thumbnail view 555. The third thumbnail view 555 may be expressed as being in a searching state. If a plurality of persons (e.g., a father, a mother, and a child) are detected as objects to be tracked via the second screen 520, but a tracking image associated with a part of the objects (e.g., a child) is not obtained, the thumbnail view 555 indicating a searching state may be temporarily shown. If an image associated with a third object to be tracked (e.g., a child) is obtained via the camera group 140, the image associated with the third object to be tracked may be displayed in the third thumbnail view 555.

Figure 5B:
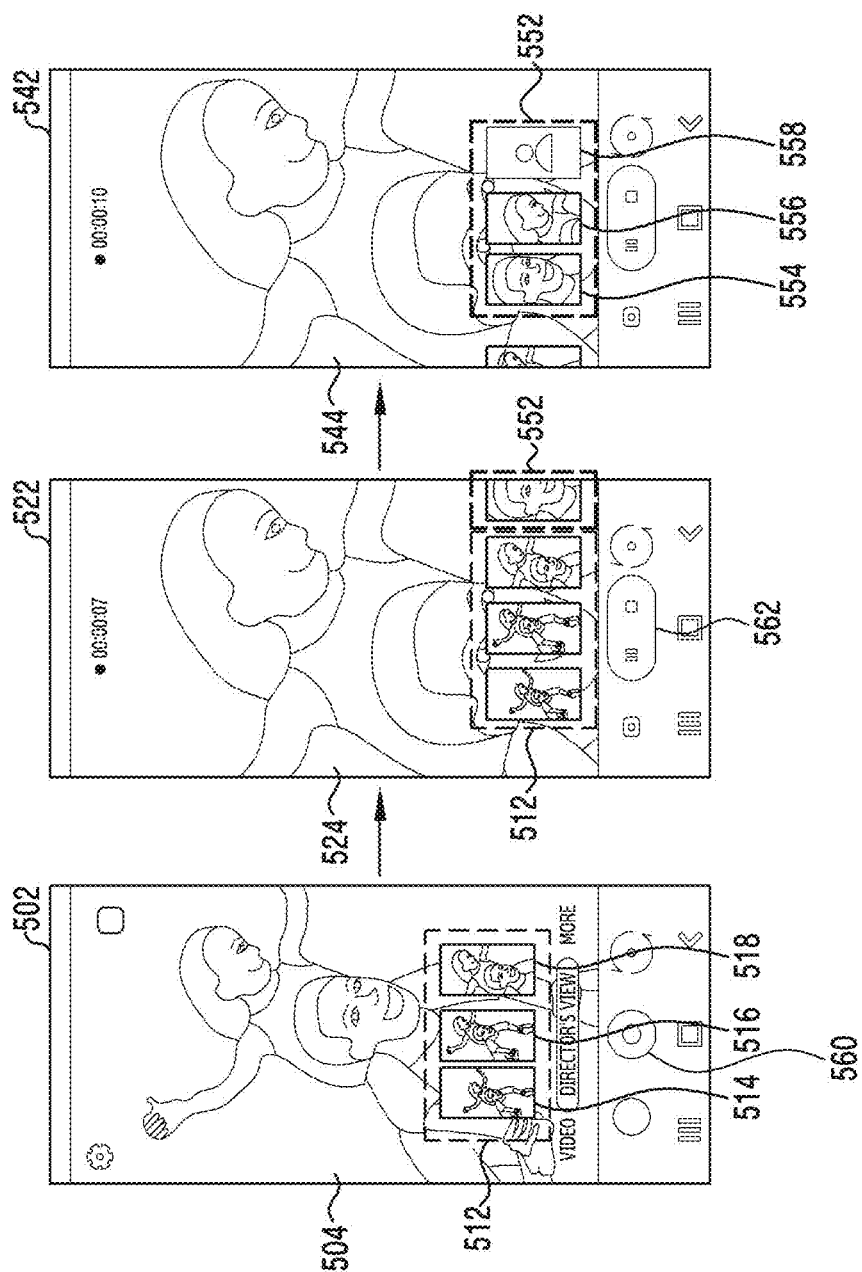
FIG. 5B is a diagram illustrating a user interface related to a multi-view and recording function of an electronic device according to an embodiment of the disclosure.

FIG. 5B is a diagram illustrating a user interface related to a multi-view and recording function of an electronic device according to an embodiment of the disclosure.

FIG. 5B illustrates the case in which two persons (e.g., a father and a child) are detected as objects to be tracked from a main preview image, and the thumbnail view (automatic tracking view) of each person is displayed.

Referring to FIG. 5B, diagrams 502, 522, and 542 illustrate screens which are sequentially switched according to a user input. The screens 502, 522, and 542 of the electronic device 100 may include thumbnail sets 512 and 552 including views with various fields of view or various types of views (e.g., an ultra-wide angle view, a wide-angle view, a telephotographic view and/or an automatic tracking view).

The first screen 502 may correspond to the screen 400 of FIG. 4.

The first screen 502 may include a main view area 504 and the first thumbnail set 512. A photographing icon 560 for capturing an image may be included in the first screen 502. The first thumbnail set 512 may be a basic thumbnail set. The first thumbnail set 512 may include views with various fields of view. For example, the first thumbnail set 512 may include a first thumbnail view 514 (e.g., an ultra-wide angle view), a second thumbnail view 516 (e.g., a wide-angle view), and a third thumbnail view 518 (e.g., a telephotographic view). In the first thumbnail view 514, the thumbnail of an image received from a first camera (e.g., an ultra-wide angle camera) may be displayed. In the second thumbnail view 516, the thumbnail of an image received from a second camera (e.g., a wide-angle camera) may be displayed. In the third thumbnail view 518, the thumbnail of an image received from a third camera (e.g., a telecamera) may be displayed.

A main preview image which is one of the images received from a plurality of cameras in the camera group 140 may be displayed in the main view area 504. The thumbnail view (e.g., the first thumbnail view 514) associated with the main preview image may be included in the first thumbnail set 512.

According to a user input (e.g., a touch, a tap) to the first thumbnail set 512, the image displayed on the main view area 504 may be changed. For example, if the third thumbnail view 518 is selected (e.g., touched) from the first thumbnail set 512 while the image from the first camera is being displayed in the main view area 504, the image (or the main preview image) displayed in the main view area 504 may be changed from the image from the first camera to the image from the third camera.

When the third thumbnail view 518 is selected, the first screen 502 may be changed to the second screen 522.

The second screen 522 may include a main view area 524 and the first thumbnail set 512. For example, the image from the third camera may be displayed in the main view area 524 of the second screen 522.

A part of the second thumbnail set 552 may appear in the second screen 522. For example, when automatic tracking is started, a part of the second thumbnail set 552 may appear in an edge area beside the first thumbnail set 512. To enable a user to get an ease recognition, a part of the second thumbnail set 552 displayed in the edge area may be displayed to be emphasized (e.g., displayed in a slightly large scale or displayed to flicker).

One or more objects to be tracked may be detected from a main preview image which is being displayed in the main view area 524. For example, based on one or more among a motion, a gesture, a sound, or a face in the main preview image, automatic tracking may be performed or an object to be tracked may be sensed. As another example, according to a user input (e.g., a touch interaction associated with a predetermined object in a screen), automatic tracking may be performed or an object to be tracked may be sensed.

When automatic tracking is performed, the photographing icon 560 may be changed to an automatic tracking icon 562. For example, a start function, a pause function, a stop function of automatic tracking may be provided via the automatic tracking icon 562.

When automatic tracking is performed (or according to a user input), the second screen 522 may be changed to the third screen 542. For example, when automatic tracking is started, the first thumbnail set 512 may be automatically updated with (or switched to) the second thumbnail set 552. As another example, according to a swipe input (e.g., a swipe to the right) to an area where the first thumbnail set 512 and the second thumbnail set 552 are displayed in the second screen 522, the first thumbnail set 512 may be updated with (or changed to) the second thumbnail set 552. Alternatively, according to a swipe input (e.g., a swipe to the left), the second thumbnail set 552 may be updated with (or changed to) the first thumbnail set 512 again.

The third screen 542 may include a main view area 544 and the second thumbnail set 552. If an input (e.g., a touch to the first thumbnail set 512) for changing a main preview image is not present, the main preview image may be maintained. In the main view area 544 of the third screen 542, a main preview image which is the same as the second screen 522 may be displayed.

The first thumbnail set 512 may be updated with the second thumbnail set 552. The second thumbnail set 552 may include one or more thumbnail views. The number of thumbnail views in the second thumbnail set 552 may correspond to the number of objects to be tracked. The third screen 542 may correspond to the case in which two persons (e.g., a father and a child) which are objects to be tracked are detected from the main preview image, and the thumbnail view 554 and 556 of each person is provided in the second thumbnail set 552. The second thumbnail set 552 may include a first thumbnail view 554 of a first object to be tracked and a second thumbnail view 556 of a second object to be tracked. The number of thumbnail views in the second thumbnail set 552 (or an updated thumbnail set) may correspond to the number of thumbnail views in the first thumbnail set 512 (or a basic thumbnail set). The second thumbnail set 552 may include a third thumbnail view 558 so as to correspond to the number of thumbnail views in the first thumbnail set 512. As illustrated above, if the number of objects to be tracked is 2 and the number of thumbnail views in the first thumbnail set 512 (or a basic thumbnail set) is 3, the third thumbnail view 558 which is an extra thumbnail view may be included in the second thumbnail set 552. The third thumbnail view 558 may be expressed as being in a searching state. If an object to be tracked (e.g., a child) is additionally detected from the main preview image and/or thumbnail image, an image associated with the object to be tracked may be displayed in the third thumbnail view 558.

Figure 6:
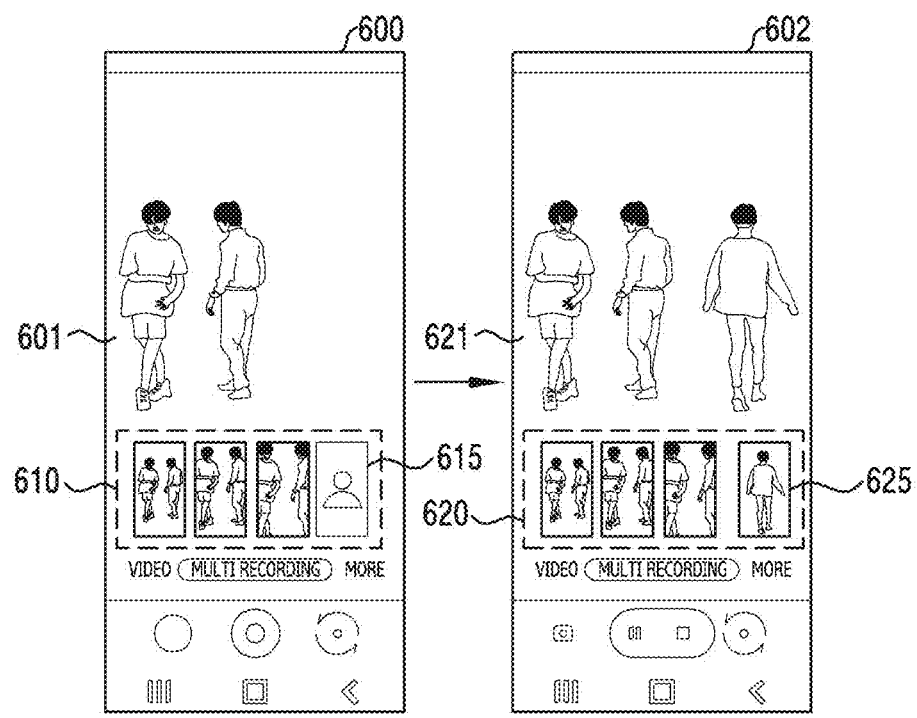
FIG. 6 is a diagram illustrating a user interface related to an automatic tracking view function of an electronic device according to an embodiment of the disclosure.

FIG. 6 is a diagram illustrating a user interface related to an automatic tracking view function of an electronic device according to an embodiment of the disclosure.

Referring to FIG. 6, a first screen 600 may include a main view area 601 and a first thumbnail set 610. The first thumbnail set 610 may include thumbnail views (basic thumbnail views, e.g., an ultra-wide angle thumbnail view, a wide-angle thumbnail view, a telephotographic thumbnail view) for images received from the camera group 140 including a plurality of cameras. The first thumbnail set 610 may include an extra thumbnail view 615.

The first screen 600 may be updated with a second screen 602. The second screen 602 may include a main view area 621 and a second thumbnail set 620. The first thumbnail set 610 in the first screen 600 may be updated with the second thumbnail set 620 in the second screen 602. When the first thumbnail set 610 is updated with the second thumbnail set 620, at least some of the thumbnail views of the first thumbnail set 610 may be changed or a new thumbnail view (e.g., an automatic tracking view) may be added.

If an object to be tracked is further added in the middle (e.g., in the middle of performing photographing, using a camera, or executing an application), a thumbnail view 625 (automatic tracking view) associated with the object to be tracked may be added, and the first thumbnail set 610 may be updated with the second thumbnail set 620 including the additional thumbnail view 625.

Although FIG. 6 illustrates the case in which each of the thumbnail views in the first thumbnail set 610 corresponds to one of the cameras, the scope of embodiments is not limited thereto. For example, if three objects to be tracked are included in a main preview image displayed in the main view area 601, three thumbnail views (automatic tracking views) corresponding to respective objects to be tracked may be displayed in the first thumbnail set 610. If the number of the thumbnail views in the first thumbnail set 610 is 3, and three or more objects (e.g., four persons) to be tracked are sensed, an extra thumbnail view (an automatic tracking view) (e.g., one thumbnail view) is automatically added to the first thumbnail set 610, and the first thumbnail set 610 may be updated with the second thumbnail set 620.

Figure 7:
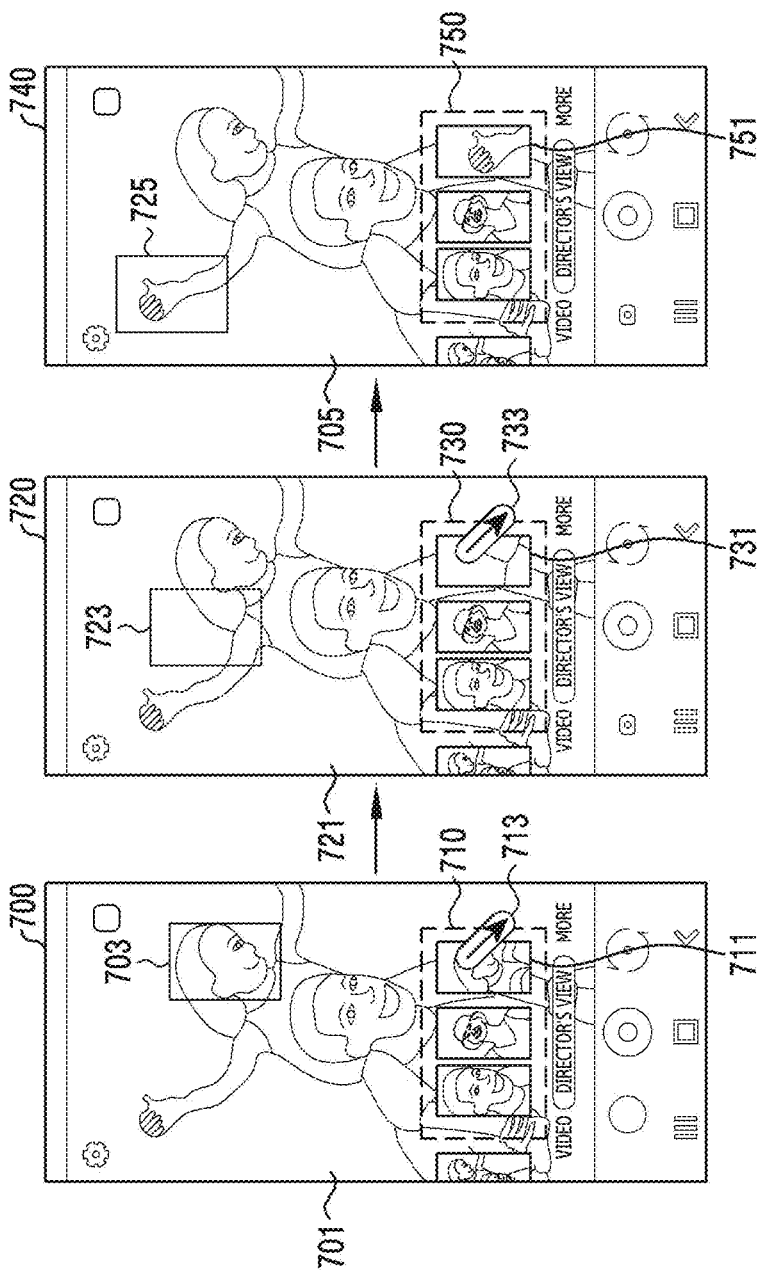
FIG. 7 is a diagram illustrating a user interface related to an automatic tracking view function of an electronic device according to an embodiment of the disclosure.

FIG. 7 is a diagram illustrating a user interface related to an automatic tracking view function of an electronic device according to an embodiment of the disclosure.

Referring to FIG. 7, it illustrates a change of an object to be tracked. In the example of FIG. 7, a first screen 700 may be switched to a second screen 720, and the second screen 720 may be switched to a third screen 740.

Diagram 701 may be the main view area of the first screen 700. The diagram 710 may be a first thumbnail set in the first screen 700. The first thumbnail set 710 may include a plurality of thumbnail views (automatic tracking views).

Diagram 721 may be the main view area of the second screen 720. Diagram 730 may be a second thumbnail set in the second screen 720. The second thumbnail set 730 may include a plurality of thumbnail views (automatic tracking views).

Diagram 705 may be the main view area of the third screen 740. Diagram 750 may be a third thumbnail set in the third screen 740. The third thumbnail set 750 may include a plurality of thumbnail views (automatic tracking views).

A user may select a thumbnail view to change, and may change an object to be tracked of the corresponding thumbnail view in a thumbnail area, or may track a desired object.

For example, the object to be tracked may be changed from a first subject (e.g., person 1) to a second subject (e.g., person 2). As another example, the object to be tracked may be changed from a first part (e.g., a face) of one subject (e.g., one person) to a second part (e.g., a hand).

According to a user input 713 (e.g., a swipe in a diagonal direction) to a predetermined thumbnail view in the first thumbnail set 710, an object to be tracked via the predetermined thumbnail view may be changed.

As illustrated in the drawing, according to the user input 713 to the predetermined thumbnail view, the predetermined thumbnail view may be updated from a first thumbnail view 711 to a second thumbnail view 731, and may be updated from the second thumbnail view 731 to a third thumbnail view 751. While a first object (e.g., the face of a child) is displayed in the first thumbnail view 711, the user input 713 may be received. According to the user input 713 to the first thumbnail view 711, an object to be tracked may be changed from the first object (e.g., the face of the child) to a second object. The second object may be displayed in the third thumbnail view 751. According to a user input 733 to the second thumbnail view 731, an object to be tracked may be changed from the second object to a third object (e.g., a hand of the child). The second thumbnail 731 may be updated with the third thumbnail set 751. The third object may be displayed in the third thumbnail view 751.

An indicator 703 associated with an object to be tracked may be displayed in the first screen 700. If the object to be tracked is changed, the location of display of the indicator 703 may be changed to correspond to the object to be tracked. As illustrated in the drawing, indicators 723 and 725 indicating a change of an object to be tracked may be sequentially displayed in the main view area 701 of the first screen 700, the main view area 721 of the second screen 720, and the main view area 705 of the third screen 740.

The first thumbnail view 711 may correspond to the indicator 703 indicating an object to be tracked in the main preview area 701. The second thumbnail view 731 may correspond to the indicator 723 indicating an object to be tracked in the main preview area 721. The third thumbnail view 751 may correspond to the indicator 725 indicating an object to be tracked in the main preview area 705.

Figure 8:
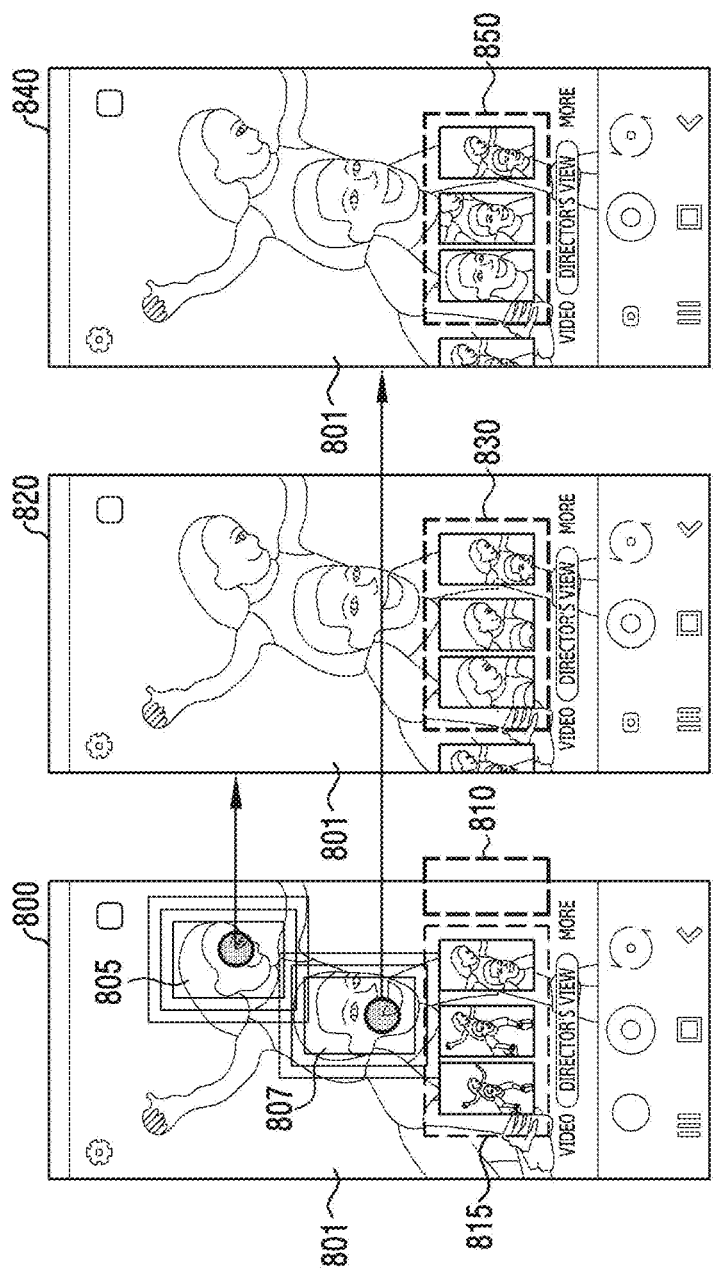
FIG. 8 is a diagram illustrating a user interface related to an automatic tracking view function of an electronic device according to an embodiment of the disclosure.

FIG. 8 is a diagram illustrating a user interface related to an automatic tracking view function of an electronic device according to an embodiment of the disclosure.

Referring to FIG. 8, in the electronic device 100, a first screen 800 may be switched to a second screen 820, and the second screen 820 may be switched to a third screen 840.

The first screen 800 may include a main view area 801 and a first thumbnail set 815. In the main preview area 801, a first image (e.g., an image from a second camera which is set as a default) which is a main preview image. The first thumbnail set 815 may include three thumbnail views (e.g., an image from a first camera, an image from a second camera, and an image from a third camera).

The first image may include a first object 805 (e.g., a child) and a second object 807 (e.g., a father).

If the first object 805 is detected from the first image (e.g., if a user touches (selects) the first object 805 in the first screen 800), a first thumbnail set 815 may be updated with a second thumbnail set 830.

The second screen 820 may include the main view area 801 and a second thumbnail set 830. The second thumbnail set 830 may include three thumbnail views obtained by adjusting a zooming rate (e.g., x1, x2, x4) based on the first object 805 (e.g., a child) in the first image. For example, an image from a single camera (e.g., a main preview image) may be adjusted based on different magnifications and may be displayed in different thumbnail views. As another example, images from a plurality of cameras may be adjusted based on different magnifications and may be displayed in different thumbnail views.

If the second object 807 (e.g., the father) is detected from the first image (e.g., if a user touches (selects) the second object 807 in the first screen 800), the first thumbnail set 815 may be updated with a third thumbnail set 850.

The third screen 840 may include the main view area 801 and the third thumbnail set 850. The third thumbnail set 850 may include three thumbnail views obtained by adjusting a zooming rate based on the second object 807 (e.g., the father) in the first image.

If a predetermined object is sensed, the first thumbnail set 815 may be updated with the second thumbnail set 830 or the third thumbnail set 850 including a thumbnail view(s) obtained by adjusting zooming based on the predetermined object. When the first thumbnail set 815 is updated with the second thumbnail set 830 or the third thumbnail set 850, all the previous thumbnail views included in the first thumbnail set 815 are changed all together to other thumbnail views, or one or more new thumbnail views may be newly added.

For example, according to a user input to the first image, a predetermined object to be tracked may be sensed. In this instance, in the second thumbnail set 830 in the second screen 820 or the third thumbnail set 850 in the third screen 840, thumbnail views that track the predetermined object with different zooming rates respectively via the plurality of cameras in the camera group 140 may be displayed.

The electronic device 100 may recommend adding the second thumbnail set 830 or the third thumbnail set 850 to a screen at once. For example, if a user touches the child which is the first object 805 in the first screen 800, an effect (e.g., displaying a new icon or flickering) indicating that a new thumbnail view may be allowed in a thumbnail area 810 on one side of the first thumbnail set 815 may be provided. The electronic device 100 may provide a notification window indicating "Would you like to adjust zooming?", and if a user approves of the same, the electronic device 100 may change the first thumbnail set 815 to the second thumbnail set 830.

Figure 9:
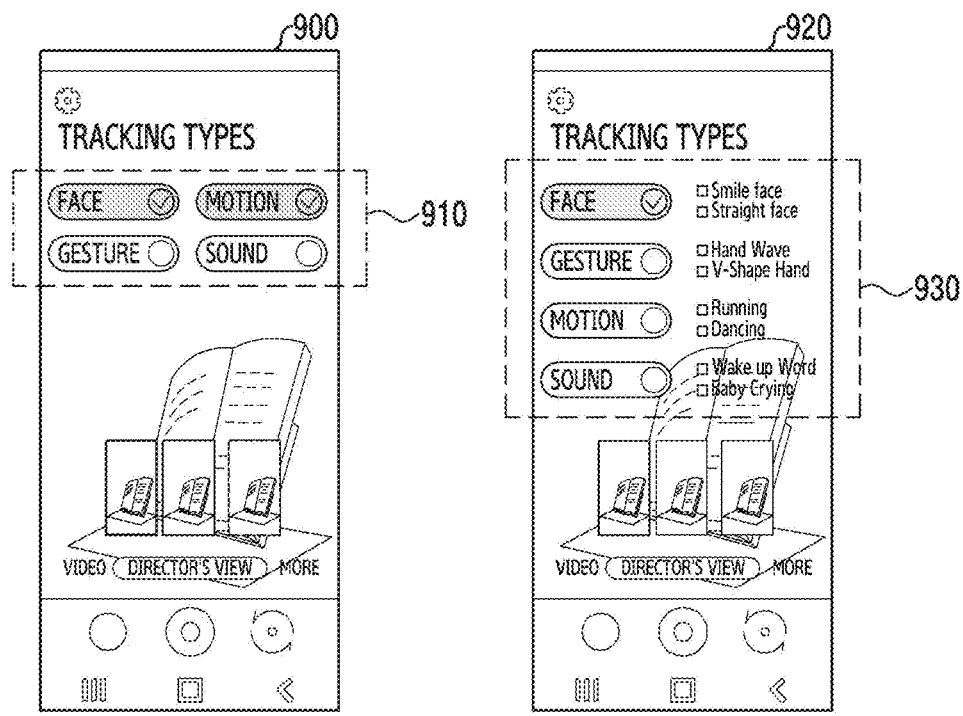
FIG. 9 is a diagram illustrating a screen for setting a condition for an automatic tracking view in an electronic device according to an embodiment of the disclosure.

FIG. 9 is a diagram illustrating a screen for setting a condition for an automatic tracking view in an electronic device according to an embodiment of the disclosure. The automatic tracking condition may be set variously by a user. One or multiple tracking options may be set.

Referring to FIG. 9, a first screen 900 may be a screen for setting an automatic tracking condition. A second screen 920 may be a screen for setting an automatic tracking condition.

The first screen 900 may provide a tracking option selection menu 910. For example, one or more among a face, a motion, a gesture, and/or a sound may be set as tracking options.

One or more tracking options (e.g., a face and a motion) among a face, a motion, a gesture, and a sound may be selected by a user. A plurality of tracking options for detecting a tracking target (or an object) may be used. For example, in the case in which 'face+motion' are set as tracking options, if the face of a person who is moving is detected (or recognized), an automatic tracking view corresponding to the detected face of the person may be added to a screen. As another example, in the case in which 'face+sound' are set as tracking options, if the face of a person who is speaking is detected (or recognized), an automatic tracking view corresponding to the detected face of the person may be added to a screen.

The second screen 920 may provide a tracking option selection menu 930. For example, an option related to a face (e.g., smiling/straight/sad), an option related to a gesture (e.g., hand shaking/clapping/v-shape hand/hand wave), an option related to a motion (e.g., dancing/jumping/running/walking), and an option related to a sound (e.g., a specified word (e.g., a starting word), a baby crying) may be provided.

Figure 10A:
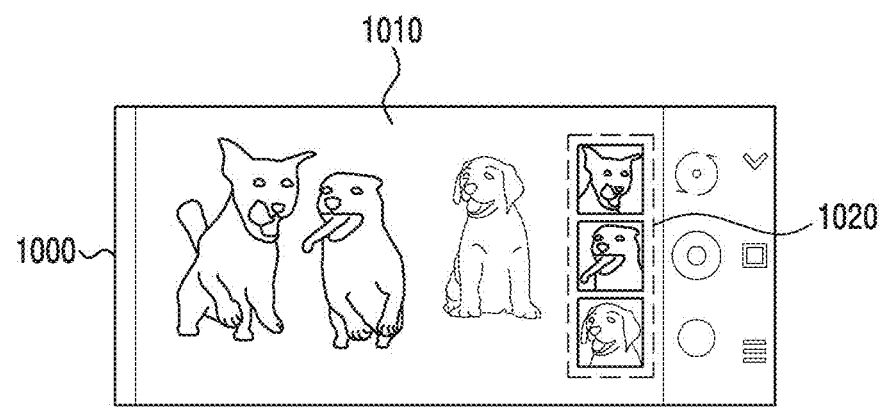
FIG. 10A is a diagram illustrating a screen based on a condition for an automatic tracking view in an electronic device according to an embodiment of the disclosure.

FIG. 10A is a diagram illustrating a screen based on a condition for an automatic tracking view in an electronic device according to an embodiment of the disclosure.

Referring to FIG. 10A, in a main view area 1010 of a screen 1000, a first image received from the camera group 140 may be displayed. In the first image, a first object (e.g., puppy 1), a second object (e.g., puppy 2), and a third object (e.g., puppy 3) may be included.

If 'motion' is set as an automatic tracking condition, the electronic device 100 may identify puppies that move as objects to be tracked in the first image. The electronic device 100 may recommend adding a thumbnail set 1020 including automatic tracking views based on respective puppies. If a user approves of the same, the thumbnail set 1020 including the automatic tracking views associated with the respective puppies may be additionally displayed in the screen 1000.

Figure 10B:
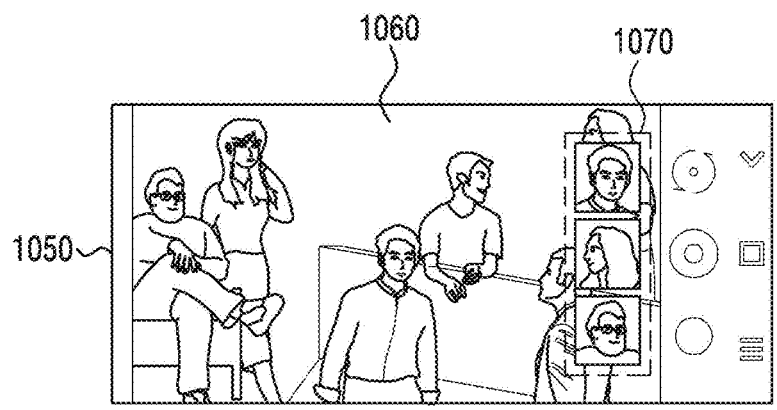
FIG. 10B is a diagram illustrating a screen based on a condition for an automatic tracking view in an electronic device according to an embodiment of the disclosure.

FIG. 10B is a diagram illustrating a screen based on a condition for an automatic tracking view in an electronic device according to an embodiment of the disclosure.

Referring to FIG. 10B, in a main view area 1060 of a screen 1050, a first image received from the camera group 140 may be displayed. In the first image, a first object (e.g., person 1), a second object (e.g., person 2), and a third object (e.g., person 3) may be included.

If 'sound+face' are set as automatic tracking conditions, and a plurality of persons are having a meeting, the electronic device 100 may sense, based on a face and a sound, persons who speak as objects to be tracked. The electronic device 100 may recommend adding a thumbnail set 1070 including automatic tracking views based on respective persons who speak. If a user approves of the same, the thumbnail set 1070 including the automatic tracking views associated with the respective persons who speak may be additionally displayed in the screen 1050.

Figure 11:
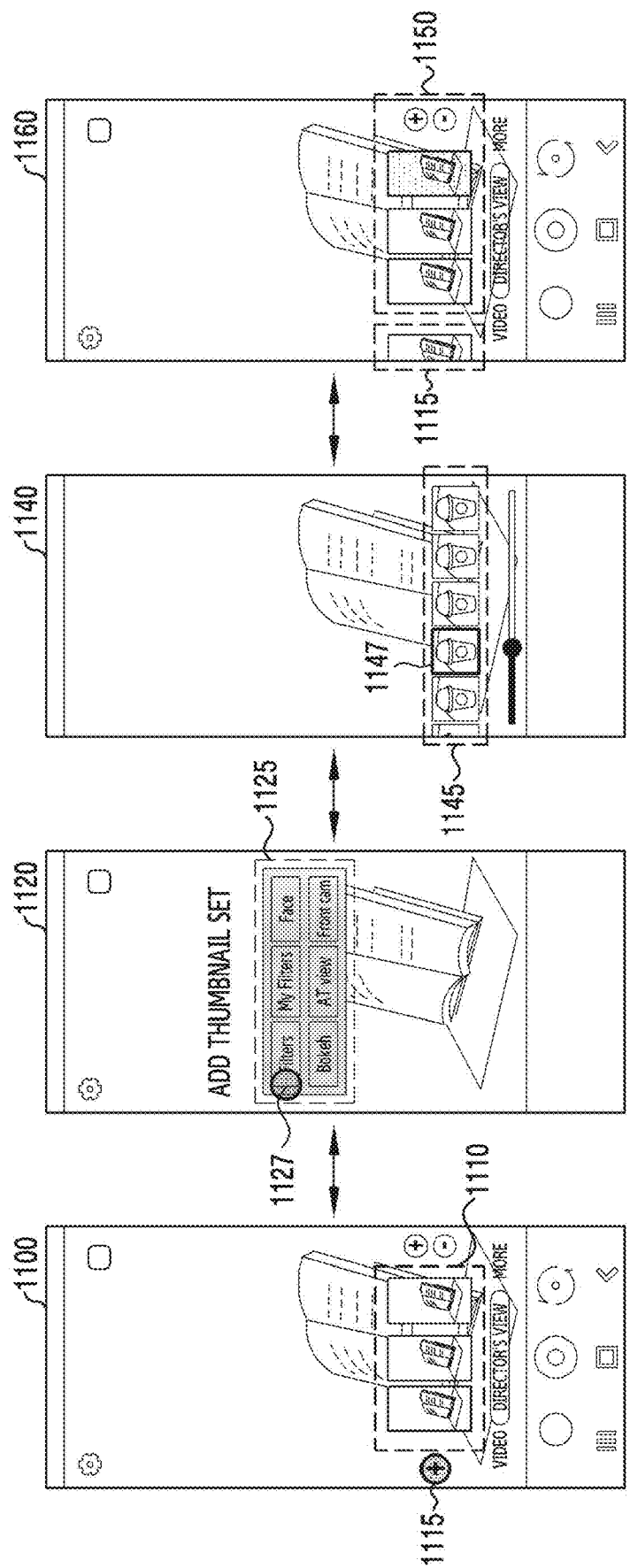
FIG. 11 is a diagram illustrating a user interface related to a view extension function in an electronic device according to an embodiment of the disclosure.

FIG. 11 is a diagram illustrating a user interface related to a view extension function of an electronic device according to an embodiment of the disclosure.

Referring to FIG. 11, the screen of the electronic device 100 may be switched sequentially in order of a first screen 1100, a second screen 1120, a third screen 1140, and a fourth screen 1160.

In a first thumbnail set 1110 of the first screen 1100 may include a plurality of basic views. A view add button 1115 may be displayed close to the thumbnail set 1110.

If the view add button 1115 is selected, the first screen 1100 may be switched to the second screen 1120. A selection menu 1125 associated with various types of view sets addable to the second screen 1120 may be displayed. For example, if a user input 1127 that selects an additional view set (filter view set) is provided, the second screen 1120 may be switched to the third screen 1140 in response to the user input 1127.

An additional view set 1145 including a plurality of views may be displayed in the third screen 1140. The views in the additional view set 1145 may show states including different correction effects. If one additional view 1147 is selected by a user from the additional view set 1145 of the third screen 1140, the third screen 1140 may be switched to the fourth screen 1160.

As illustrated in the fourth screen 1160, a second thumbnail set 1150 may be added. The second thumbnail set 1150 may include corrected views obtained by applying, to the basic views of the first thumbnail set 1110, a correction effect which is same as the correction effect applied to the selected additional view 1147.

As described above, according to the user input 1127 that requests a correction effect, the first thumbnail set 1110 may be updated with the second thumbnail set 1150 to which the correction effect is applied, or views to which the correction effect is applied may be added to the basic views of the first thumbnail set 110 and providable views may be increased.

Figure 12:
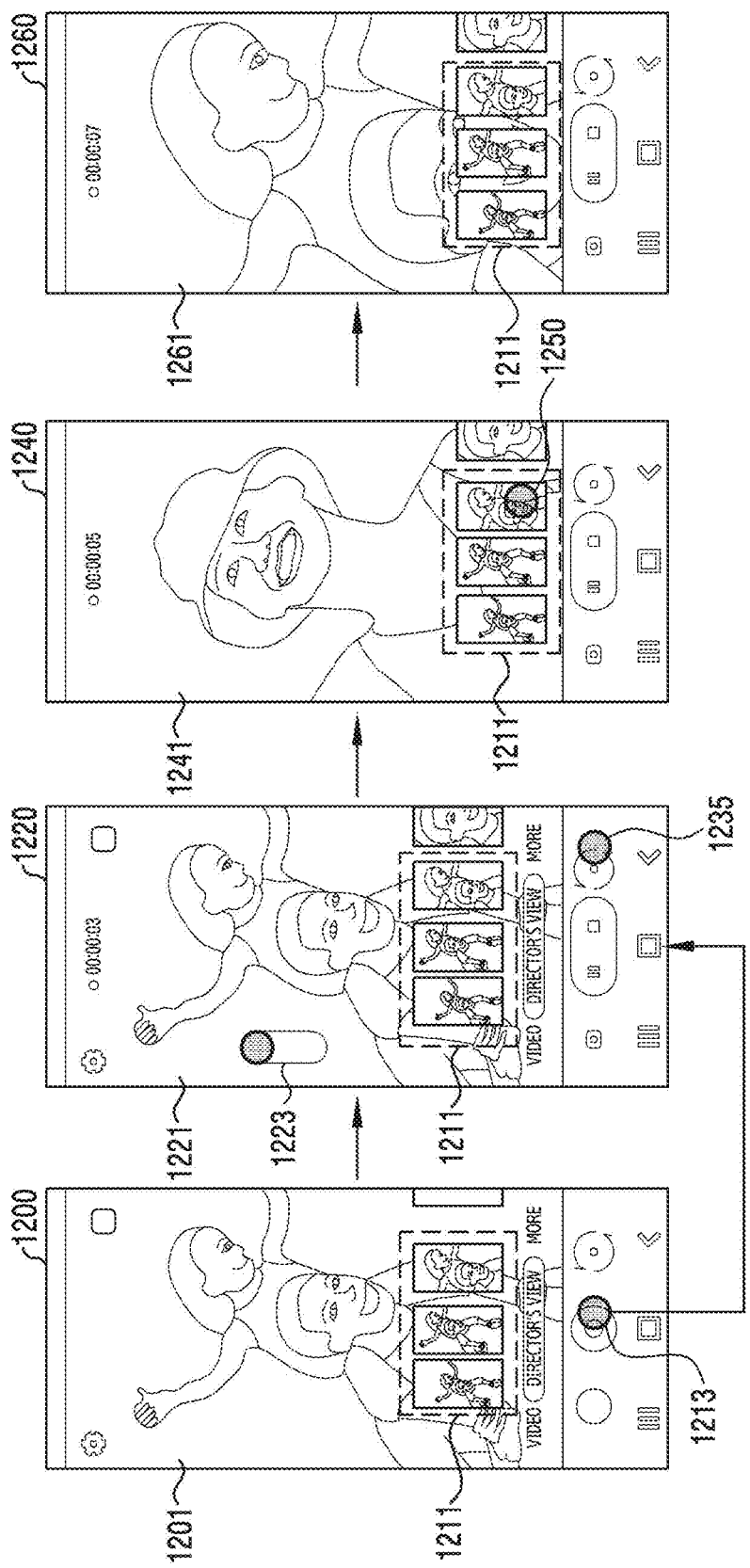
FIG. 12 is a diagram illustrating a user interface related to a multi-view and recording function in an electronic device according to an embodiment of the disclosure.

FIG. 12 is a diagram illustrating a user interface related to a multi-view and recording function of an electronic device according to an embodiment of the disclosure.

Referring to FIG. 12, a first screen 1200 may be a single view screen that shows a first image (or a video) (e.g., an image from a first back camera) in a main view area 1201 as a main preview image. The first screen 1200 may include a thumbnail set 1211. The thumbnail set 1211 may include a plurality of thumbnail views (e.g., an ultra-wide angle view from a first back camera, a wide-angle view from a second back camera, and a telephotographic view from a third back camera).

According to a user input 1213 (e.g., a touch, a tap) to a photographing icon in the first screen 1200, the first screen 1200 may be switched to a second screen 1220.

The second screen 1220 may be a single-view recording screen that is recording a first image which is being displayed in the form of a single view. The first image may be continuously displayed in a main view area 1221 of the second screen 1220. In a part of the main view area 1221, a slider icon 1223 may be provided so that the first image that is being recorded may be viewed in real time.

According to a user input 1235 (e.g., a touch, a tap) to a camera switching icon in the second screen 1220, the second screen 1220 may be switched to a third screen 1240. The main preview image may be switched from the first image (e.g., the image from the first back camera) to a second image (or a video, e.g., an image from the front camera).

The third screen 1240 may be a single view screen that shows the second image in a main view area 1241 as a main preview image. If a change of a thumbnail view is not present, the thumbnail set 1211 of the first screen 1200 may be maintained as it is in the second screen 1220, the third screen 1240, and the fourth screen 1260, although the main preview image is changed.

If a user input 1250 (e.g., a touch, a tap) that selects one thumbnail view from the thumbnail set 1211 in the third screen 1240, a third image (or a video, e.g., an image from the third back camera) corresponding to the selected thumbnail view may be selected as a main preview image. The main preview image may be changed from the second image to the third image. Since the main preview image is changed, the third screen 1240 may be switched to the fourth screen 1260. The third image may be displayed in a main view area 1261 of the fourth screen 1260.

The fourth screen 1260 may be a single-view recording screen that is recording the third image which is being displayed in the form of a single view. Although the main preview image is changed, image/video recording may be continuously performed. For example, the first image (or a first video), the second image (or a second video), and the third image (or a third video) recorded with different fields of view (or different types of images) that a user freely selects by changing a view may be successively recorded and may be stored as a single image.

Figure 13:
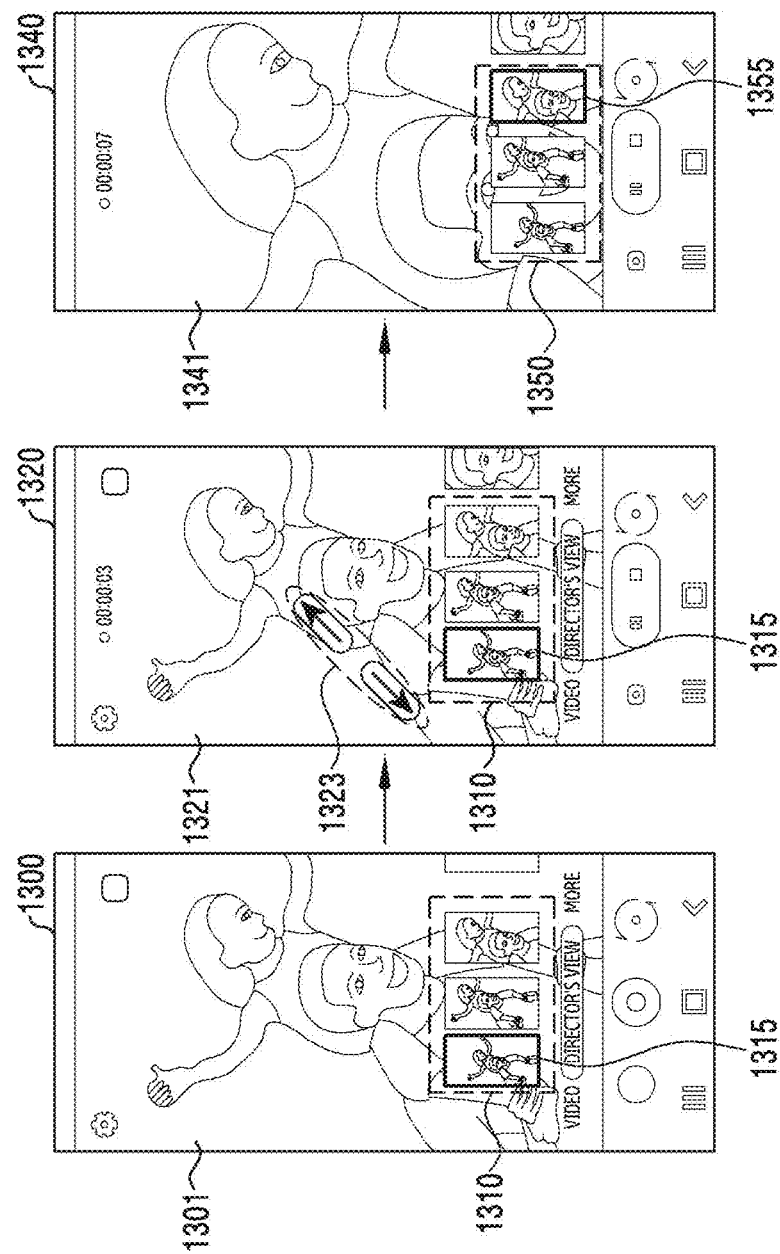
FIG. 13 is a diagram illustrating a user interface related to a multi-view and recording function in an electronic device according to an embodiment of the disclosure.

FIG. 13 is a diagram illustrating a user interface related to a multi-view and recording function in an electronic device according to an embodiment of the disclosure.

Referring to FIG. 13, a first screen 1300 may be a single view screen that shows a first image (e.g., an image from a first back camera) in a main view area 1301 as a main preview image. The first screen 1300 may include a thumbnail set 1310. The thumbnail set 1310 may include a first thumbnail view 1315 (e.g., an ultra-wide-angle view from the first back camera). In addition, the thumbnail set 1310 may include a second thumbnail view (e.g., a wide-angle view from a second back camera) and a third thumbnail view (e.g., a telephotographic view from a third back camera).

If recording an image (or a video) begins, the first screen 1300 may be switched to a second screen 1320. The second screen 1320 may be a single-view recording screen that is recording a first image (or a main preview image) which is being displayed in the form of a single view.

Display of the first image may be maintained in a main view area 1321 of the second screen 1320. If a user input 1323 (e.g., a pinch-out) for zooming is provided to the main view area 1321 of the second screen 1320, the second screen 1320 may be switched to a third screen 1340.

Zooming is applied to the first image which is the main preview image and a zoomed-in image may be displayed in a main view area 1341 of the third screen 1340. Zooming may also be applied to a thumbnail area where a thumbnail set 1350 is displayed, as well as to the main view area 1341. For example, as illustrated in the drawing, when zooming is applied to the first image, a default thumbnail view may be automatically changed from the first thumbnail view 1315 to a third thumbnail view 1355 corresponding to the field of view of the applied zoom.

Figure 14:
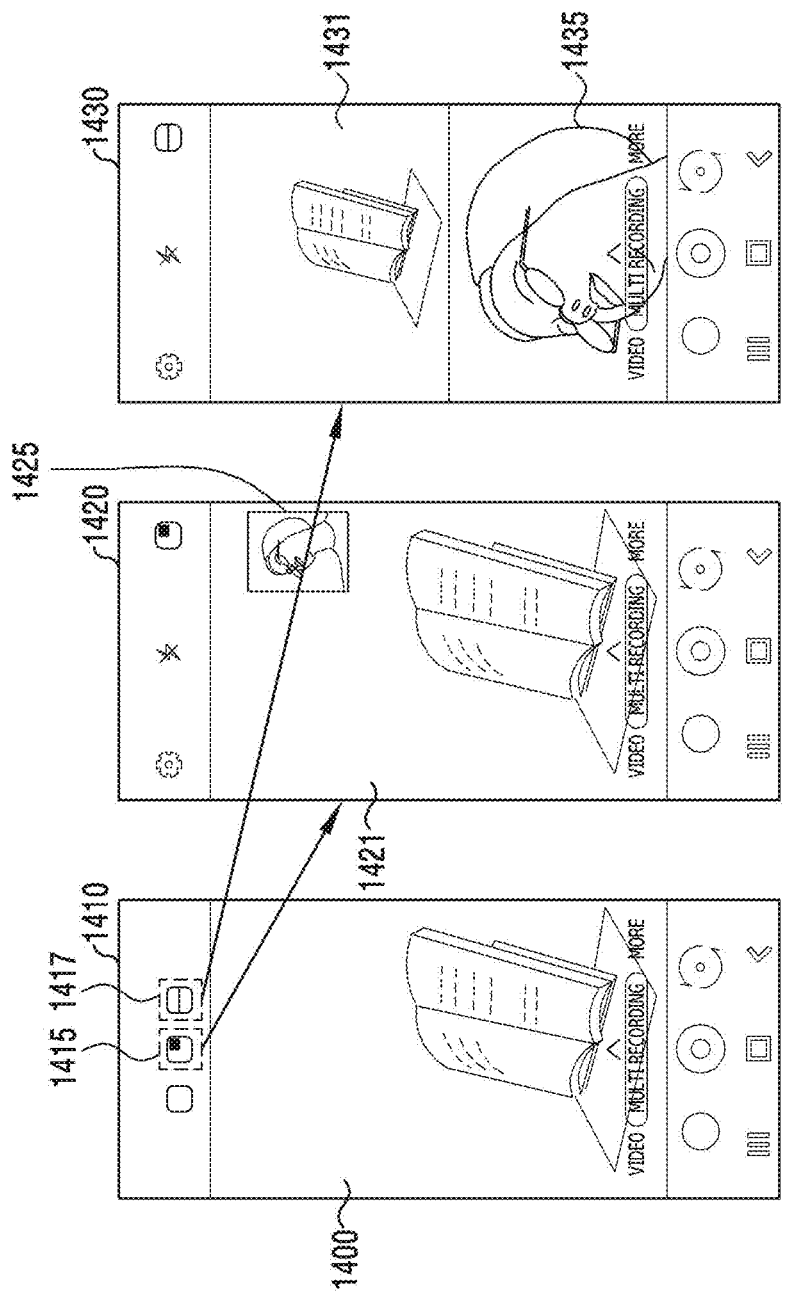
FIG. 14 is a diagram illustrating a user interface related to a view change function in an electronic device according to an embodiment of the disclosure.

FIG. 14 is a diagram illustrating a user interface related to a view change function in an electronic device according to an embodiment of the disclosure.

Referring to FIG. 14, a main preview image may be displayed in various manners. For example, the main preview image may be displayed in the form of a single view/dual PIP view/dual split view. A mode may be switched among the single view mode, dual PIP view mode, and the dual split view mode. For example, view mode switching may be performed using icons 1415 and 1417.

A first screen 1410 may be an example of a single view mode. For example, the single view mode may be set to a default mode. A first screen 1410 may be an execution screen of an application that uses the camera group 140.

In a main view area 1400 of the first screen 1410, a first image received from the camera group 140 may be displayed in the single view mode. The first icon 1415 for selecting the dual PIP view mode and the second icon 1417 for selecting the dual split view may be included in the first screen 1410.

If the first icon 1415 is selected in the first screen 1410, the first screen 1410 may be switched to a second screen 1420. The first image and a second image received from the camera group 140 may be displayed in the second screen 1420 in the dual PIP view mode. The second screen 1420 may include a main view 1421 displaying the first image and a sub-view 1425 displaying the second image.

If the second icon 1417 is selected in the first screen 1410, the first screen 1410 may be switched to a third screen 1430. The first image and the second image received from the camera group 140 may be displayed in the third screen 1430 in the dual split view mode. The third screen 1430 may include a first split view 1431 and a second split view 1435.

Figure 15:
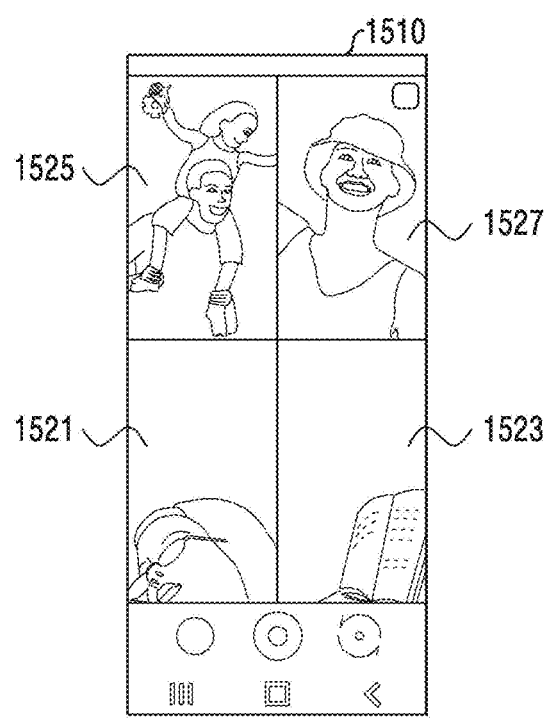
FIG. 15 is a diagram illustrating a user interface related to a view division function in an electronic device according to an embodiment of the disclosure.

FIG. 15 is a diagram illustrating a user interface related to a view division function in an electronic device according to an embodiment of the disclosure.

Referring to FIG. 15, a screen 1510 of the electronic device 100 may include a plurality of split views 1521, 1523, 1525, and 1527. For example, a first split view 1521, a second split view 1523, a third split view 1525, and a fourth split view 1527 may be included in the screen 1510.

In addition to the views via a plurality of cameras (e.g., local cameras) contained in the electronic device 100, a view via an external camera (e.g., a cloud camera) may be included in the screen 1510. For example, the first split view 1521 may be a view via a first cloud camera. The second split view 1523 may be a view via a second cloud camera. The third split view 1515 may be a view via a back camera. The fourth split view 1527 may be a view via a front camera.

Figure 16:
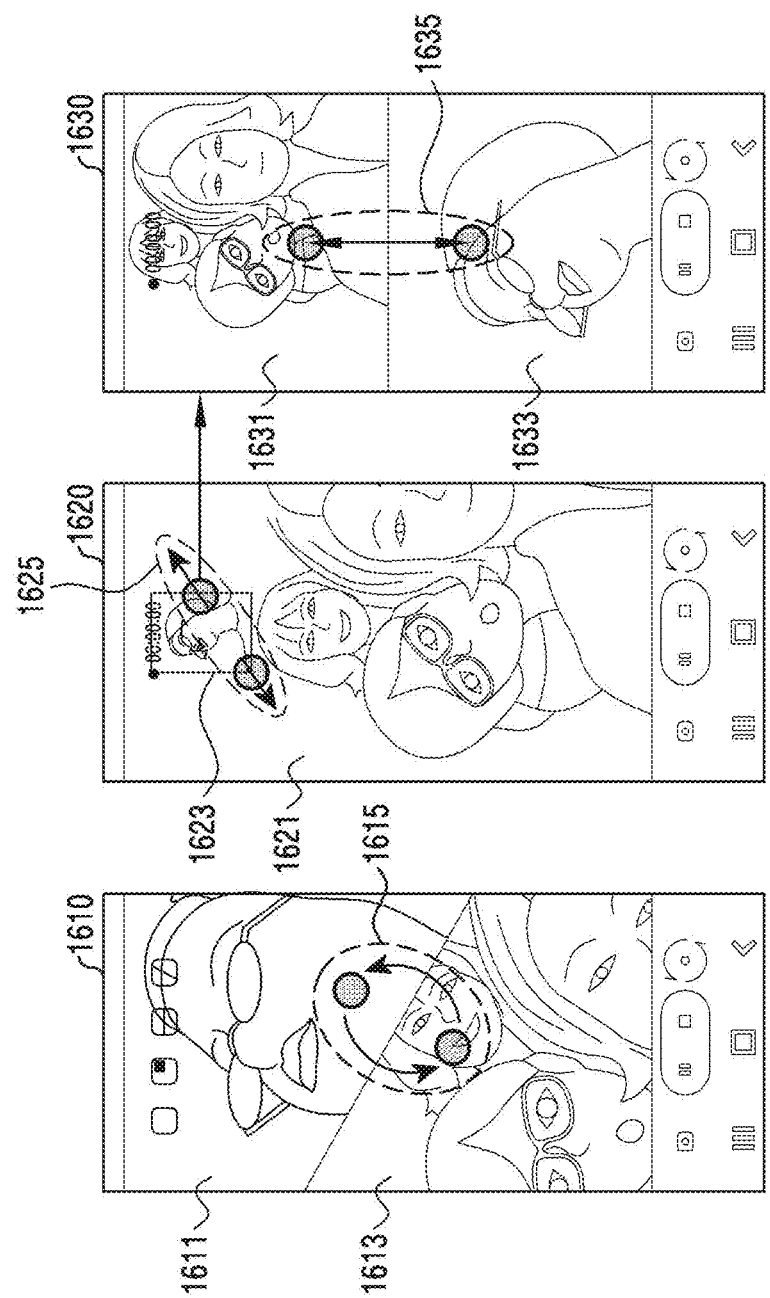
FIG. 16 is a diagram illustrating a user interface related to a view change function in an electronic device according to an embodiment of the disclosure.

FIG. 16 is a diagram illustrating a user interface related to a view change function in an electronic device according to an embodiment of the disclosure.

Referring to FIG. 16, according to a user input 1615 (e.g., a gesture interaction), the disposition of a plurality of views which are being displayed may be freely changed.

A first screen 1610 may include a first split view 1611 and a second split view 1613 which are disposed in a diagonal direction. The second split view 1613 may be a view via a first camera. The second split view 1613 may be a view via a second camera. According to a user input 1615 (e.g., a gesture of touching and rotating using two fingers) to the first screen 1610, the first screen 1610 may be switched to a second screen 1620. The dual split views 1611 and 1613 which are disposed in a diagonal direction in the first screen 1610 may be changed to a main view 1621 and a sub-view 1623 inserted to a partial area of the main view 1621 and may be displayed in the second screen 1620.

According to a user input 1625 (e.g., a pinch-out) to the sub-view 1623 in the second screen 1620, the second screen 1620 may be switched to a third screen 1630. The third screen 1630 may include a first split view 1631 and a second split view 1633 which are disposed in parallel.

According to a user input 1635 (e.g., a gesture of touching and rotating using two fingers) to the third screen 1630, the disposition of the two split views 1631 and 1633 may be switched. For example, the first split view 1631 on the top may be moved down, and the second split view 1633 on the bottom may be moved up.

Figure 17:
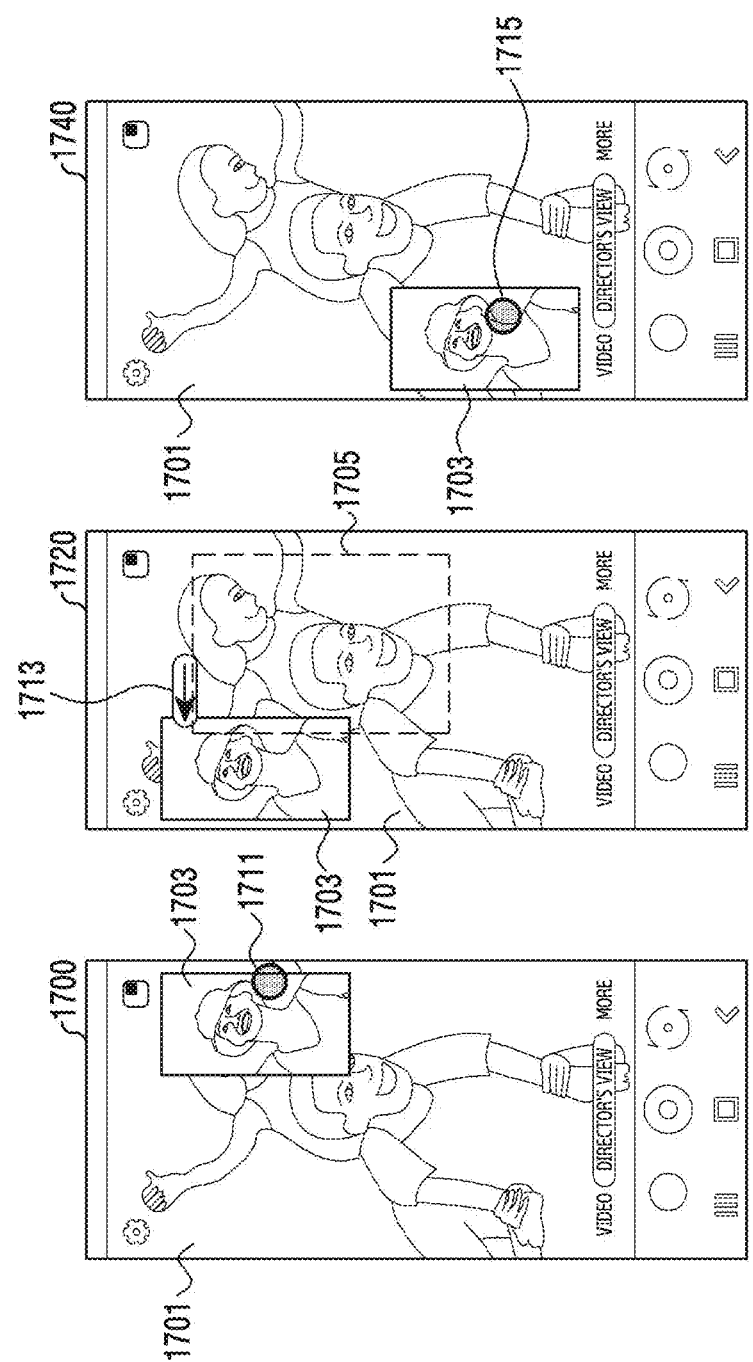
FIG. 17 is a diagram illustrating a user interface related to a view movement function in an electronic device according to an embodiment of the disclosure.

FIG. 17 is a diagram illustrating a user interface related to a view movement function in an electronic device according to an embodiment of the disclosure.

Referring to FIG. 17, a first screen 1700, a second screen 1720, and a third screen 1740 may be examples of screens which show the movement of a sub-view 1703.

In the first screen 1700, a main view 1701 and the sub-view 1703 may be displayed in a dual PIP view mode.

For example, the location of the sub-view 1703 may be changed according to a user input (e.g., a touch interaction). According to a user input that drags as shown in diagram 1713 in the state of touching the sub-view 1703 as shown in diagram 1711, the sub-view 1703 may move from a first location to a second location as illustrated in the drawing. The second screen 1720 shows the state of the sub-view 1703 which has been moved to the second location. In this manner, the location where a thumbnail view is displayed on a screen may be moved according to a user input.

As another example, the sub-view 1703 may be automatically moved and may be displayed in a location deviated from a main subject 1705. The third screen 1740 shows the state of the sub-view 1703 which has been moved to a third location which is deviated from the main subject 1705. An indicator (e.g., an indication of the boundary of the main subject 1705 or an indication suggesting a swipe) that suggests movement of the sub-view 1703 may be displayed in the second screen 1720. If a user input 1715 (e.g., a touch and drag) to the sub-view 1703 is present in the third screen 1740, the location of the sub-view 1703 may be readjusted based on the user input 1715. In this manner, an embodiment in which a thumbnail view is moved so as to be displayed in a location deviated from a main subject on a screen may be implemented. An indicator suggesting the movement of a thumbnail view may be displayed on a screen.

Figure 18:
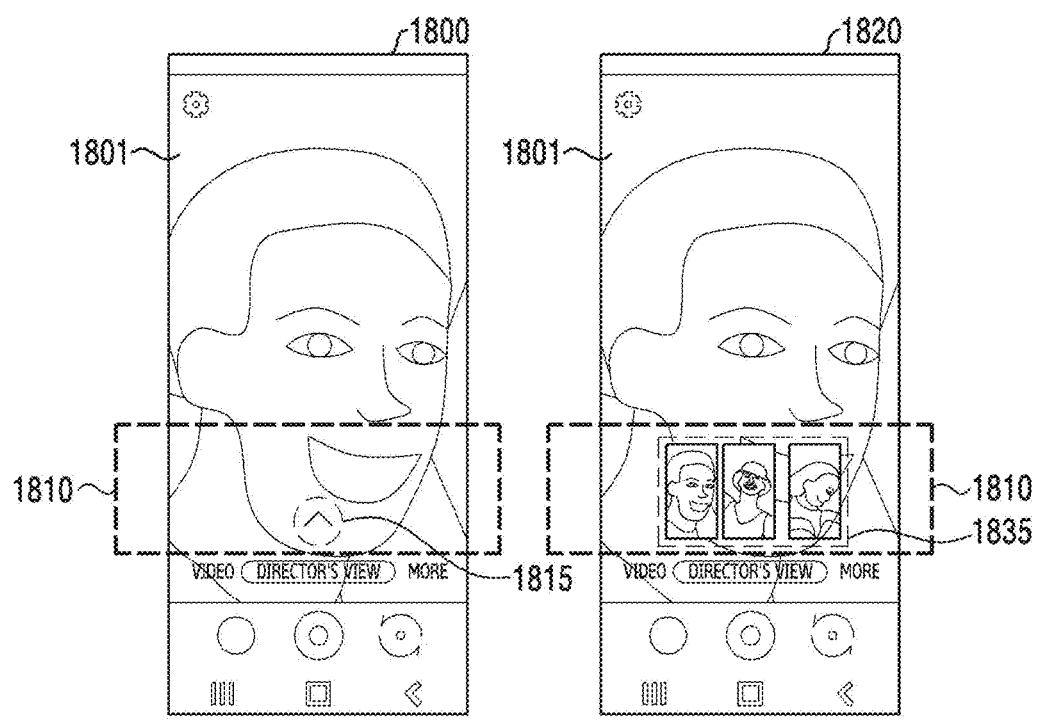
FIG. 18 is a diagram illustrating a user interface related to a view hiding function/view showing function of an electronic device according to an embodiment of the disclosure.

FIG. 18 is a diagram illustrating a user interface related to a view hiding function/view showing function in an electronic device according to an embodiment of the disclosure.

Referring to FIG. 18, a first screen 1800 may include a main view area 1801. A handler 1815 may be displayed in the bottom of the main view area 1801. A second screen 1820 may include the main view area 1801. The second screen 1820 may include a thumbnail area 1810 where a thumbnail set 1835 is displayed.

The handler 1815 may be displayed in the bottom of the main view area 1801 in the first screen 1800. According to a user input (e.g., a touch or swipe up/down to the handler 1815), a hiding function or a showing function associated with the thumbnail area 1810 may be performed. For example, if a touch input or a swipe-up input is provided to the handler 1815, a hidden view showing function is performed and a thumbnail set 1835 may appear in the thumbnail area 1810. In this instance, the first screen 1800 may be switched to a second screen 1820. If a swipe-down input is provided, a view hiding function is performed and the thumbnail set 1835 may disappear from the thumbnail area 1810.

Figure 19:
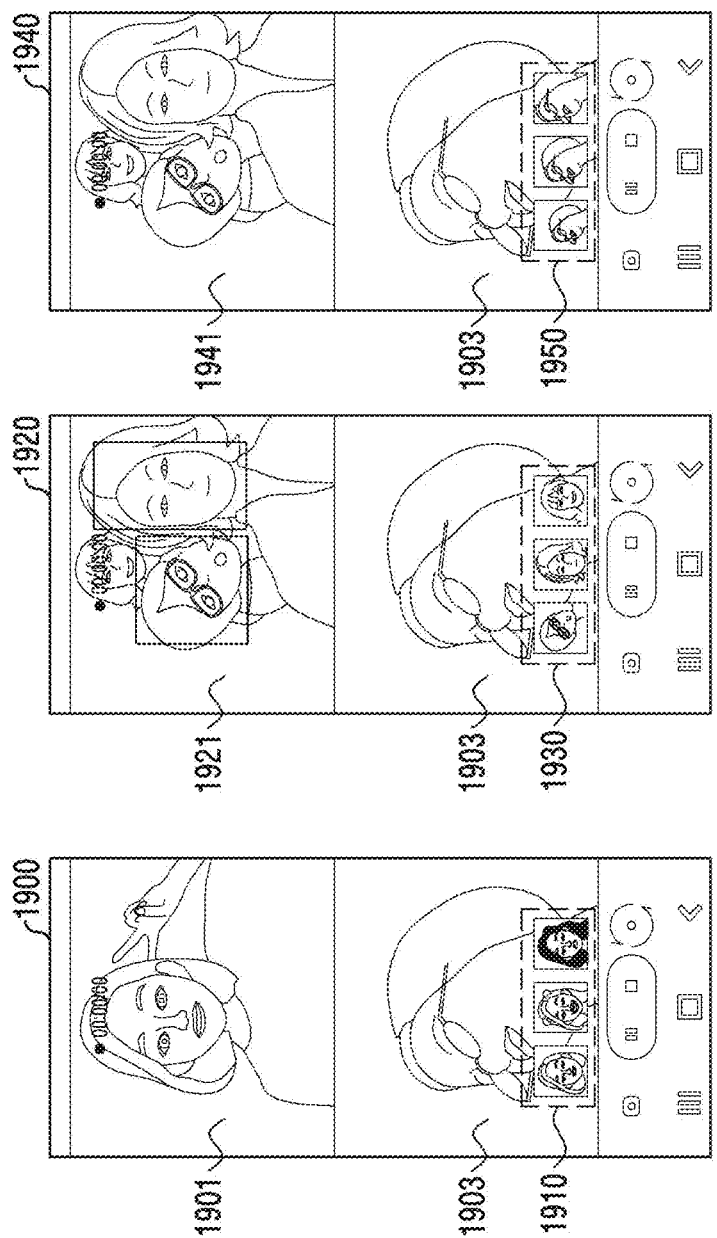
FIG. 19 is a diagram illustrating a user interface related to a view extension function of an electronic device according to an embodiment of the disclosure.

FIG. 19 is a diagram illustrating a user interface related to a view extension function of an electronic device according to an embodiment of the disclosure. A multi-view and recording function may be used as a video tool which is useful for editing a video.

Referring to FIG. 19, the electronic device 100 may add various types of thumbnail views to a thumbnail set 1910, 1930, and 1950 in a screen 1900, 1920, and 1940, so as to support easy making of a video.

A first screen 1900 may include a first split view 1901 and a second split view 1903. In the first screen 1900, a first thumbnail set 1910 may be included.

In the first thumbnail set 1910, a thumbnail view in which a captured face is changed to a facial emoticon to which an augmented reality (AR) content is added may be displayed. An on/off function for an emoticon mode may be provided.

A second screen 1920 may include a first split view 1921 and a second split view 1903. In the second screen 1920, a second thumbnail set 1930 may be included.

In the second thumbnail set 1930, thumbnail views associated with faces detected from the first split view 1921 (e.g., a back camera view) may be included. A beauty face set value set in advance may be automatically applied to a captured face and may be displayed in each thumbnail view.

A third screen 1940 may include a first split view 1941 and the second split view 1903. In the third screen 1940, a third thumbnail set 1950 may be included.

In the third thumbnail set 1950, thumbnail views associated with a face detected from the second split view 1903 (e.g., a front camera view) may be included. In the third thumbnail set 1950, thumbnail views obtained by adjusting the image of the second split view 1903 with different zooming rates may be included. For example, options for a field of view (e.g., wide, normal, closeup) may be additionally provided so that a subject that takes a selfie is capable of freely adjusting the size of his or her face. If the specifications of the front camera are lower than the specifications of the back camera, a zooming rate which does not deteriorate an image quality may also be provided.

Figure 20:
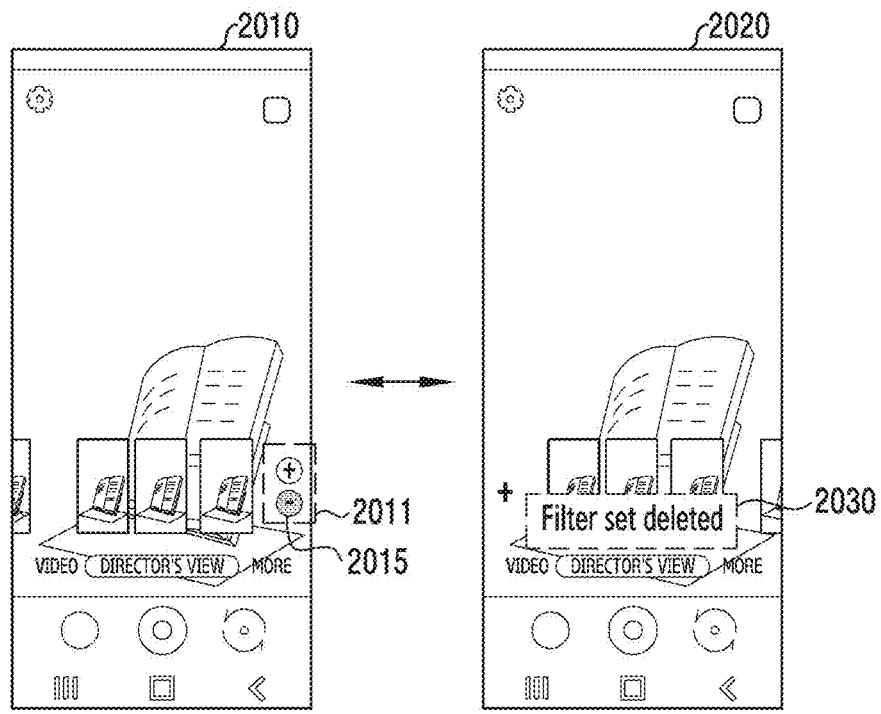
FIG. 20 is a diagram illustrating a user interface related to a view customizing function in an electronic device according to an embodiment of the disclosure.

FIG. 20 is a diagram illustrating a user interface related to a view customizing function in an electronic device according to an embodiment of the disclosure.

Referring to FIG. 20, a view customizing function (e.g., a view add function/view delete function) may be provided via a first screen 2010. If the view customizing function (e.g., the view add function/view delete function) is performed, switching between the first screen 2010 and a second screen 2020 may be performed.

In the first screen 2010, an icon 2011 for adding a view or deleing a view may be added. According to a user input 2015 to a view delete icon, thumbnail views which are being displayed may be deleted. A second screen 2020 shows an example of the state in which thumbnail views are deleted and a notification window 2030 indicating that views are deleted may be displayed. In this manner, an embodiment that provides an icon for adding or deleting a thumbnail view in a thumbnail set may be implemented.

Figure 21:
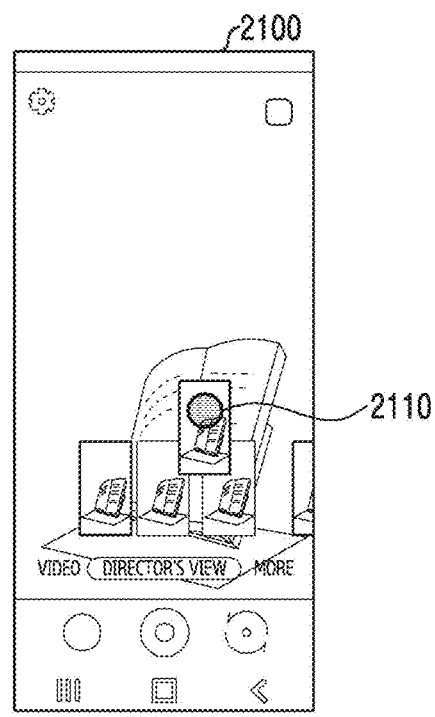
FIG. 21 is a diagram illustrating a user interface related to a view customizing function in an electronic device according to an embodiment of the disclosure.

FIG. 21 is a diagram illustrating a user interface related to a view customizing function in an electronic device according to an embodiment of the disclosure.

Referring to FIG. 21, a view customizing function (e.g., a view movement function) may be provided via a screen 2100 of FIG. 21. For example, according to a user input 2110 (e.g., a touch and drag) to a predetermined thumbnail view, the predetermined thumbnail view may be moved from a first location to a second location. In this manner, an embodiment that changes the order of display of thumbnail views included in a thumbnail set may be implemented.

FIG. 22 is a block diagram 2200 illustrating a camera module 2380 according to various embodiments. FIG. 23 is a block diagram illustrating an electronic device 2301 in a network environment 2300 according to various embodiments.

Referring to FIG. 22, the camera module 2380 may include a lens assembly 2210, a flash 2220, an image sensor 2230, an image stabilizer 2240, a memory 2250 (e.g., buffer memory), or an image signal processor 2260. The lens assembly 2210 may collect light emitted or reflected from an object whose image is to be taken. The lens assembly 2210 may include one or more lenses. According to an embodiment of the disclosure, the camera module 2380 may include a plurality of lens assemblies 2210. In such a case, the camera module 2380 may form, for example, a dual camera, a 360-degree camera, or a spherical camera. Some of the plurality of lens assemblies 2210 may have the same lens attribute (e.g., view angle, focal length, auto-focusing, f number, or optical zoom), or at least one lens assembly may have one or more lens attributes different from those of another lens assembly. The lens assembly 2210 may include, for example, a wide-angle lens or a telephoto lens.

The flash 2220 may emit light that is used to reinforce light reflected from an object. According to an embodiment of the disclosure, the flash 2220 may include one or more light emitting diodes (LEDs) (e.g., a red-green-blue (RGB) LED, a white LED, an infrared (IR) LED, or an ultraviolet (UV) LED) or a xenon lamp. The image sensor 2230 may obtain an image corresponding to an object by converting light emitted or reflected from the object and transmitted via the lens assembly 2210 into an electrical signal. According to an embodiment of the disclosure, the image sensor 2230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 2230 may be implemented using, for example, a charged coupled device (CCD) sensor or a complementary metal oxide semiconductor (CMOS) sensor.

The image stabilizer 2240 may move the image sensor 2230 or at least one lens included in the lens assembly 2210 in a particular direction, or control an operational attribute (e.g., adjust the read-out timing) of the image sensor 2230 in response to the movement of the camera module 2380 or the electronic device 2301 including the camera module 2380. This allows compensating for at least part of a negative effect (e.g., image blurring) by the movement on an image being captured. According to an embodiment of the disclosure, the image stabilizer 2240 may identify such a movement by the camera module 2380 or the electronic device 2301 using a gyro sensor (not shown) or an acceleration sensor (not shown) disposed inside or outside the camera module 2380. According to an embodiment of the disclosure, the image stabilizer 2240 may be implemented, for example, as an optical image stabilizer.

The memory 2250 may store, at least temporarily, at least part of an image obtained via the image sensor 2230 for a subsequent image processing task. For example, if image capturing is delayed due to shutter lag or multiple images are quickly captured, a raw image obtained (e.g., a Bayer-patterned image, a high-resolution image) may be stored in the memory 2250, and its corresponding copy image (e.g., a low-resolution image) may be previewed via the display module 2360. Thereafter, if a specified condition is met (e.g., by a user's input or system command), at least part of the raw image stored in the memory 2250 may be obtained and processed, for example, by the image signal processor 2260. According to an embodiment of the disclosure, the memory 2250 may be configured as at least part of a memory 2330 or as a separate memory that is operated independently from the memory 2330.

The image signal processor 2260 may perform one or more image processing with respect to an image obtained via the image sensor 2230 or an image stored in the memory 2250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 2260 may perform control (e.g., exposure time control or read-out timing control) with respect to at least one (e.g., the image sensor 2230) of the components included in the camera module 2380. An image processed by the image signal processor 2260 may be stored back in the memory 2250 for further processing, or may be provided to an external component (e.g., the memory 2330, the display module 2360, an external electronic device 2302, the external electronic device 2304, or a server 2308) outside the camera module 2380. According to an embodiment of the disclosure, the image signal processor 2260 may be configured as at least part of the processor 2320, or as a separate processor that is operated independently from the processor 2320. If the image signal processor 2260 is configured as a separate processor from the processor 2320, at least one image processed by the image signal processor 2260 may be displayed, by the processor 2320, via the display module 2360 as it is or after being further processed.

According to an embodiment of the disclosure, the electronic device 2301 may include a plurality of camera modules 2380 having different attributes or functions. In such a case, at least one of the plurality of camera modules 2380 may form, for example, a wide-angle camera and at least another of the plurality of camera modules 2380 may form a telephoto camera. Similarly, at least one of the plurality of camera modules 2380 may form, for example, a front camera and at least another of the plurality of camera modules 2380 may form a rear camera.

Figure 23:
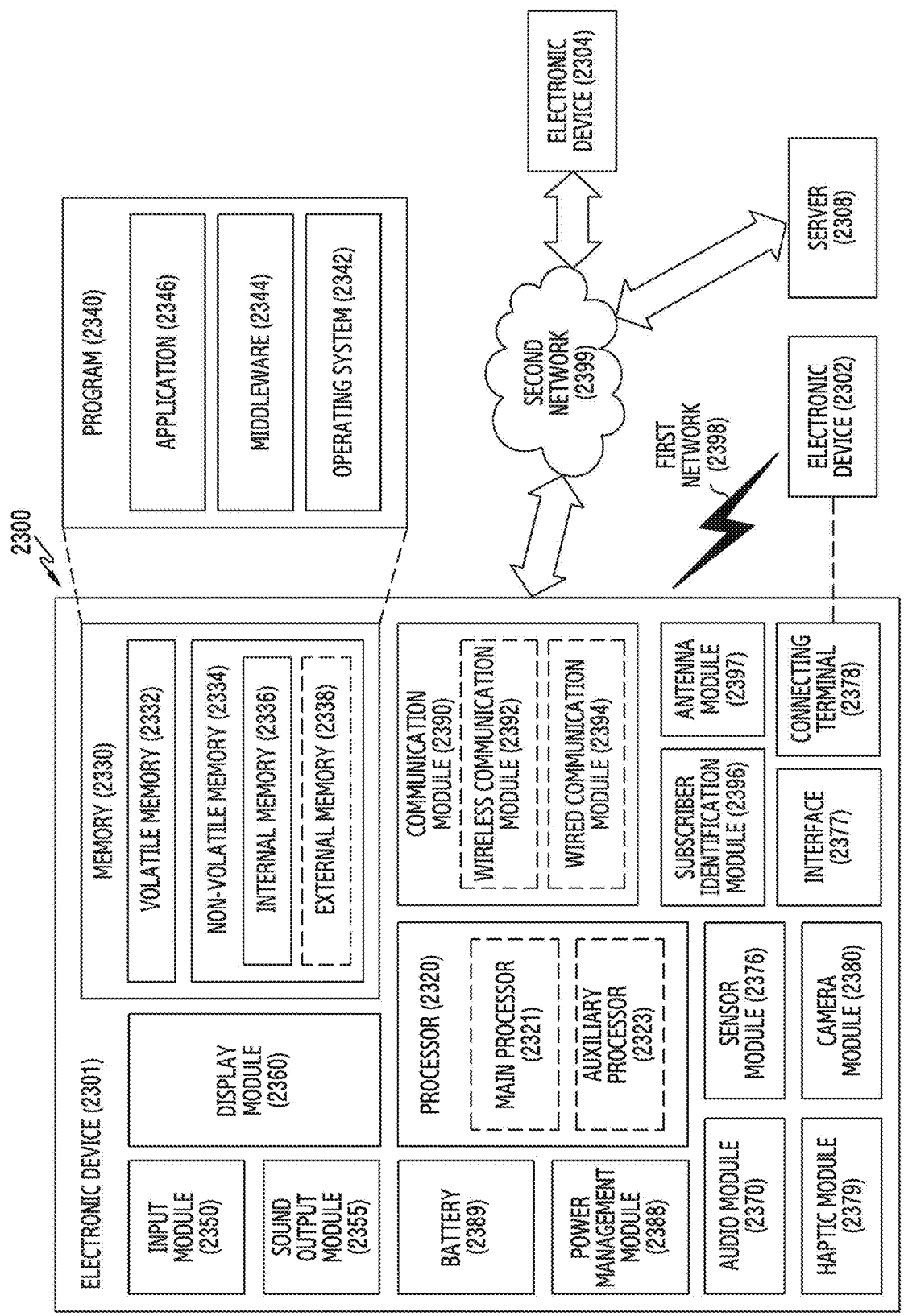
FIG. 23 is a block diagram illustrating an electronic device in a network environment according to an embodiment of the disclosure.

Referring to FIG. 23, the electronic device 2301 in the network environment 2300 may communicate with the external electronic device 2302 via a first network 2398 (e.g., a short-range wireless communication network), or at least one of the external electronic device 2304 or a server 2308 via a second network 2399 (e.g., a long-range wireless communication network). According to an embodiment of the disclosure, the electronic device 2301 may communicate with the external electronic device 2304 via the server 2308. According to an embodiment of the disclosure, the electronic device 2301 may include a processor 2320, a memory 2330, an input module 2350, a sound output module 2355, a display module 2360, an audio module 2370, a sensor module 2376, an interface 2377, a connecting terminal 2378, a haptic module 2379, a camera module 2380, a power management module 2388, a battery 2389, a communication module 2390, a subscriber identification module (SIM) 2396, or an antenna module 2397. In some embodiments of the disclosure, at least one of the components (e.g., the connecting terminal 2378) may be omitted from the electronic device 2301, or one or more other components may be added in the electronic device 2301. In some embodiments of the disclosure, some of the components (e.g., the sensor module 2376, the camera module 2380, or the antenna module 2397) may be implemented as a single component (e.g., the display module 2360).

The processor 2320 may execute, for example, software (e.g., a program 2340) to control at least one other component (e.g., a hardware or software component) of the electronic device 2301 coupled with the processor 2320, and may perform various data processing or computation. According to one embodiment of the disclosure, as at least part of the data processing or computation, the processor 2320 may store a command or data received from another component (e.g., the sensor module 2376 or the communication module 2390) in a volatile memory 2332, process the command or the data stored in the volatile memory 2332, and store resulting data in a non-volatile memory 2334. According to an embodiment of the disclosure, the processor 2320 may include a main processor 2321 (e.g., a central processing unit (CPU) or an application processor (AP)), or an auxiliary processor 2323 (e.g., a graphics processing unit (GPU), a neural processing unit (NPU), an image signal processor (ISP), a sensor hub processor, or a communication processor (CP)) that is operable independently from, or in conjunction with, the main processor 2321. For example, when the electronic device 2301 includes the main processor 2321 and the auxiliary processor 2323, the auxiliary processor 2323 may be adapted to consume less power than the main processor 2321, or to be specific to a specified function. The auxiliary processor 2323 may be implemented as separate from, or as part of the main processor 2321.

The auxiliary processor 2323 may control at least some of functions or states related to at least one component (e.g., the display module 2360, the sensor module 2376, or the communication module 2390) among the components of the electronic device 2301, instead of the main processor 2321 while the main processor 2321 is in an inactive (e.g., sleep) state, or together with the main processor 2321 while the main processor 2321 is in an active state (e.g., executing an application). According to an embodiment of the disclosure, the auxiliary processor 2323 (e.g., an image signal processor or a communication processor) may be implemented as part of another component (e.g., the camera module 2380 or the communication module 2390) functionally related to the auxiliary processor 2323. According to an embodiment of the disclosure, the auxiliary processor 2323 (e.g., the neural processing unit) may include a hardware structure specified for artificial intelligence model processing. An artificial intelligence model may be generated by machine learning. Such learning may be performed, e.g., by the electronic device 2301 where the artificial intelligence is performed or via a separate server (e.g., the server 2308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2330 may store various data used by at least one component (e.g., the processor 2320 or the sensor module 2376) of the electronic device 2301. The various data may include, for example, software (e.g., the program 2340) and input data or output data for a command related thereto. The memory 2330 may include the volatile memory 2332 or the non-volatile memory 2334.

The program 2340 may be stored in the memory 2330 as software, and may include, for example, an operating system (OS) 2342, middleware 2344, or an application 2346.

The input module 2350 may receive a command or data to be used by another component (e.g., the processor 2320) of the electronic device 2301, from the outside (e.g., a user) of the electronic device 2301. The input module 2350 may include, for example, a microphone, a mouse, a keyboard, a key (e.g., a button), or a digital pen (e.g., a stylus pen).

The sound output module 2355 may output sound signals to the outside of the electronic device 2301. The sound output module 2355 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 2360 may visually provide information to the outside (e.g., a user) of the electronic device 2301. The display module 2360 may include, for example, a display, a hologram device, or a projector and control circuitry to control a corresponding one of the display, hologram device, and projector. According to an embodiment of the disclosure, the display module 2360 may include a touch sensor adapted to detect a touch, or a pressure sensor adapted to measure the intensity of force incurred by the touch.

The audio module 2370 may convert a sound into an electrical signal and vice versa. According to an embodiment of the disclosure, the audio module 2370 may obtain the sound via the input module 2350, or output the sound via the sound output module 2355 or a headphone of an external electronic device (e.g., the external electronic device 2302) directly (e.g., wiredly) or wirelessly coupled with the electronic device 2301.

The sensor module 2376 may detect an operational state (e.g., power or temperature) of the electronic device 2301 or an environmental state (e.g., a state of a user) external to the electronic device 2301, and then generate an electrical signal or data value corresponding to the detected state. According to an embodiment of the disclosure, the sensor module 2376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2377 may support one or more specified protocols to be used for the electronic device 2301 to be coupled with the external electronic device (e.g., the external electronic device 2302) directly (e.g., wiredly) or wirelessly. According to an embodiment of the disclosure, the interface 2377 may include, for example, a high definition multimedia interface (HDMI), a universal serial bus (USB) interface, a secure digital (SD) card interface, or an audio interface.

A connecting terminal 2378 may include a connector via which the electronic device 2301 may be physically connected with the external electronic device (e.g., the external electronic device 2302). According to an embodiment of the disclosure, the connecting terminal 2378 may include, for example, a HDMI connector, a USB connector, a SD card connector, or an audio connector (e.g., a headphone connector).

The haptic module 2379 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 2379 may include, for example, a motor, a piezoelectric element, or an electric stimulator.

The camera module 2380 may capture a still image or moving images. According to an embodiment of the disclosure, the camera module 2380 may include one or more lenses, image sensors, image signal processors, or flashes.

The power management module 2388 may manage power supplied to the electronic device 2301. According to one embodiment of the disclosure, the power management module 2388 may be implemented as at least part of, for example, a power management integrated circuit (PMIC).

The battery 2389 may supply power to at least one component of the electronic device 2301. According to an embodiment of the disclosure, the battery 2389 may include, for example, a primary cell which is not rechargeable, a secondary cell which is rechargeable, or a fuel cell.

The communication module 2390 may support establishing a direct (e.g., wired) communication channel or a wireless communication channel between the electronic device 2301 and the external electronic device (e.g., the external electronic device 2302, the external electronic device 2304, or the server 2308) and performing communication via the established communication channel. The communication module 2390 may include one or more communication processors that are operable independently from the processor 2320 (e.g., the application processor (AP)) and supports a direct (e.g., wired) communication or a wireless communication. According to an embodiment of the disclosure, the communication module 2390 may include a wireless communication module 2392 (e.g., a cellular communication module, a short-range wireless communication module, or a global navigation satellite system (GNSS) communication module) or a wired communication module 2394 (e.g., a local area network (LAN) communication module or a power line communication (PLC) module). A corresponding one of these communication modules may communicate with the external electronic device via the first network 2398 (e.g., a short-range communication network, such as Bluetooth™, wireless-fidelity (Wi-Fi) direct, or infrared data association (IrDA)) or the second network 2399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2392 may identify and authenticate the electronic device 2301 in a communication network, such as the first network 2398 or the second network 2399, using subscriber information (e.g., international mobile subscriber identity (IMSI)) stored in the subscriber identification module 2396.

The wireless communication module 2392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2392 may support a high-frequency band (e.g., the mmWave band) to achieve, e.g., a high data transmission rate. The wireless communication module 2392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2392 may support various requirements specified in the electronic device 2301, an external electronic device (e.g., the external electronic device 2304), or a network system (e.g., the second network 2399). According to an embodiment of the disclosure, the wireless communication module 2392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2397 may transmit or receive a signal or power to or from the outside (e.g., the external electronic device) of the electronic device 2301. According to an embodiment of the disclosure, the antenna module 2397 may include an antenna including a radiating element including a conductive material or a conductive pattern formed in or on a substrate (e.g., a printed circuit board (PCB)). According to an embodiment of the disclosure, the antenna module 2397 may include a plurality of antennas (e.g., array antennas). In such a case, at least one antenna appropriate for a communication scheme used in the communication network, such as the first network 2398 or the second network 2399, may be selected, for example, by the communication module 2390 (e.g., the wireless communication module 2392) from the plurality of antennas. The signal or the power may then be transmitted or received between the communication module 2390 and the external electronic device via the selected at least one antenna. According to an embodiment of the disclosure, another component (e.g., a radio frequency integrated circuit (RFIC)) other than the radiating element may be additionally formed as part of the antenna module 2397.

According to various embodiments of the disclosure, the antenna module 2397 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 2301 and the external electronic device 2304 via the server 2308 coupled with the second network 2399. Each of the external electronic devices 2302 or 2304 may be a device of a same type as, or a different type, from the electronic device 2301. According to an embodiment of the disclosure, all or some of operations to be executed at the electronic device 2301 may be executed at one or more of the external electronic devices 2302, 2304, or 2308. For example, if the electronic device 2301 should perform a function or a service automatically, or in response to a request from a user or another device, the electronic device 2301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2301. The electronic device 2301 may provide the outcome, with or without further processing of the outcome, as at least part of a reply to the request. To that end, a cloud computing, distributed computing, mobile edge computing (MEC), or client-server computing technology may be used, for example. The electronic device 2301 may provide ultra low-latency services using, e.g., distributed computing or mobile edge computing. In another embodiment of the disclosure, the external electronic device 2304 may include an internet-of-things (IoT) device. The server 2308 may be an intelligent server using machine learning and/or a neural network. According to an embodiment of the disclosure, the external electronic device 2304 or the server 2308 may be included in the second network 2399. The electronic device 2301 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 2340) including one or more instructions that are stored in a storage medium (e.g., an internal memory 2336 or an external memory 2338) that is readable by a machine (e.g., the electronic device 2301). For example, a processor (e.g., the processor 2320) of the machine (e.g., the electronic device 2301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

An electronic device (e.g., the electronic device 100 of FIG. 1) according to various embodiments of the disclosure may include a display (e.g., the display 110 of FIG. 1), and at least one processor (e.g., the processor 120 of FIG. 1) connected to the display. The at least one processor 120 may be configured to display, in a first screen (e.g., the screen 500 and 520 of FIG. 5A, or the screen 502 or 522 of FIG. 5B) of the display, a first thumbnail set associated with images received from a camera group including a plurality of cameras and the preview of a first image which is one of the images, to identify one or more objects to be tracked from at least one of the images, to obtain one or more second images that track the one or more objects via at least one camera in the camera group, and to display, on the display, a second screen (e.g., the screen 540 of FIG. 5A, or the screen 542 of FIG. 5B) in which the first thumbnail set in the first screen is updated with a second thumbnail set associated with the one or more second images.

According to various embodiments of the disclosure, the one or more objects may be detected based on a user input, or based on one or more among a motion, a gesture, a sound, or a face.

According to various embodiments of the disclosure, the plurality of cameras may have different fields of view or different photographing directions. The first image may be obtained from a camera having a widest angle of view among the plurality of cameras.

According to various embodiments of the disclosure, according to a user input to a predetermined thumbnail view in the second thumbnail set, an object to be tracked via the predetermined thumbnail view may be changed.

According to various embodiments of the disclosure, the object may be changed from a first object to a second object, or may be changed from a first part of an object to a second part of the object.

According to various embodiments of the disclosure, an indicator indicating an object to which the object is changed in a main view area of the second screen may be displayed.

According to various embodiments of the disclosure, respective thumbnail views in the first thumbnail set may be displayed to match the one or more objects in one-to-one correspondence.

According to various embodiments of the disclosure, if a second object to be tracked is additionally detected from at least one of the images received from the camera group, a thumbnail view associated with the second object may be added to the second thumbnail set.

According to various embodiments of the disclosure, if a predetermined object to be tracked is detected according to a user input to the first image, thumbnail views that track the predetermined object with different zooming rates respectively via a plurality of cameras in the camera group may be displayed in the second thumbnail set in the second screen.

According to various embodiments of the disclosure, the thumbnail views, a number of which corresponds to a number of cameras in the camera group, may be added to the first thumbnail set at once in response to the user input.

According to various embodiments of the disclosure, according to a user input that requests a correction effect, a third thumbnail set obtained by applying the correction effect to the plurality of thumbnail views all together in the first thumbnail set or the second thumbnail set may be additionally displayed.

According to various embodiments of the disclosure, an icon for adding or deleting a thumbnail view in the first thumbnail set or the second thumbnail set may be provided, or an order of display the thumbnail views in the first thumbnail set or the second thumbnail set may be changed according to a user input.

According to various embodiments of the disclosure, the location of display of the first thumbnail set or the second thumbnail set may be moved according to a user input.

According to various embodiments of the disclosure, the first thumbnail set or the second thumbnail set may be moved so as to be displayed in a location deviated from a main subject, or an indicator indicating the movement may be displayed.

According to various embodiments of the disclosure, when the first thumbnail set is updated with the second thumbnail set, at least part of the thumbnail views in the first thumbnail set may be changed or a new thumbnail view is added.

A method of operating an electronic device according to various embodiments of the disclosure may include an operation of displaying, in a first screen, a first thumbnail set associated with images received from a camera group including a plurality of cameras and the preview of a first image which is one of the images, an operation of sensing one or more objects to be tracked from at least one of the images, an operation of obtaining one or more second images that track the one or more objects via at least one camera in the camera group, and an operation of displaying a second screen obtained by updating the first thumbnail set in the first screen with a second thumbnail set associated with the one or more second images.

According to various embodiments of the disclosure, the one or more objects may be detected based on a user input, or based on one or more among a motion, a gesture, a sound, or a face.

According to various embodiments of the disclosure, according to a user input to a predetermined thumbnail view in the second thumbnail set, an object to be tracked via the predetermined thumbnail view may be changed.

According to various embodiments of the disclosure, when a second object to be tracked is additionally detected from the second images, a thumbnail view associated with the second object may be added to the second thumbnail set.

According to various embodiments of the disclosure, when a predetermined object to be tracked is detected according to a user input to the first image, thumbnail views that track the predetermined object with different zooming rates respectively via the plurality of cameras in the camera group may be displayed in the second thumbnail set in the second screen.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a display;
a plurality of cameras;
an input interface;
memory storing one or more computer programs; and
at least one processor communicatively coupled to the display, the plurality of cameras, the input interface, and the memory,
wherein one or more computer programs include computer-executable instructions that, when executed by the at least one processor individually or collectively, cause the electronic device to:
display, on the display, a first screen including a first thumbnail set that includes thumbnail views for different images received from at least two of the plurality of cameras, and a preview of a first image which is one of the different images,
identify two or more objects to be tracked from one or more of the different images,
obtain two or more second images that respectively tracks one of the two or more objects via at least one of the plurality of cameras, and
display, on the display, a second screen obtained by updating the first thumbnail set included in the first screen with a second thumbnail set including thumbnail views for the two or more second images.

2. The electronic device of claim 1, wherein each of the two or more objects are identified based on at least one of:
a user input detected by the input interface, or
one or more among a motion, a gesture, a sound, or a face.

3. The electronic device of claim 1,
wherein the plurality of cameras have different fields of view or different photographing directions, and
wherein the first image is obtained from a camera having a widest angle of view among the plurality of cameras.

4. The electronic device of claim 1, wherein the one or more computer programs include further computer-executable instructions that, when executed by the one processor individually or collectively, cause the electronic device to:
according to a user input detected by the input interface to select a thumbnail view in the second thumbnail set, change an object, among the two or more objects, to be tracked via the selected thumbnail view.

5. The electronic device of claim 4, wherein the object is changed from a first object to a second object, or is changed from a first part of an object to a second part of the object.

6. The electronic device of claim 4, wherein the one or more computer programs include further computer-executable instructions that, when executed by the at least one processor individually or collectively, cause the electronic device to:
display, on the display, an indicator indicating another object to which the object is changed in a main view area of the second screen.

7. The electronic device of claim 1, wherein respective thumbnail views in the second thumbnail set are displayed, on the display, to match the two or more objects in one-to-one correspondence.

8. The electronic device of claim 1, if wherein the one or more computer programs include further computer-executable instructions that, when executed by the one processor individually or collectively, cause the electronic device to:
identify another object to be tracked from at least one of the different images, and
add a thumbnail view of the another object to the second thumbnail set.

9. The electronic device of claim 1, wherein the one or more computer programs include further computer-executable instructions that, when executed by the at least one processor individually or collectively, cause the electronic device to:
identify an object, among the two or more objects, to be tracked according to a user input detected by the input interface to select the first image, and
display, on the display, in the second thumbnail set included in the second screen thumbnail views that track the object with different zooming rates respectively via the at least one of the plurality of cameras.

10. The electronic device of claim 9, wherein the one or more computer programs include further computer-executable instructions that, when executed by the at least one processor individually or collectively, cause the electronic device to:
add the thumbnail views, a number of which corresponds to a number of the plurality of cameras, to the first thumbnail set all at once, in response to the user input detected by the input interface.

11. The electronic device of claim 1, wherein the one or more computer programs include further computer-executable instructions that, when executed by the one processor individually or collectively, cause the electronic device to:
according to a user input detected by the input interface to request a correction effect, a third thumbnail set obtained by applying the correction effect to a plurality of thumbnail views all together in the first thumbnail set or the second thumbnail set is additionally displayed on the display.

12. The electronic device of claim 1, wherein the one or more computer programs include further computer-executable instructions that, when executed by the at least one processor individually or collectively, cause the electronic device to one of:
provide an icon for adding or deleting a thumbnail view in the first thumbnail set or the second thumbnail set, or
change an order of display of the thumbnail views in the first thumbnail set or the second thumbnail set according to a user input detected by the input interface.

13. The electronic device of claim 1, wherein the one or more computer programs include further computer-executable instructions that, when executed by the at least one processor individually or collectively, cause the electronic device to:
move a location of display of the first thumbnail set or the second thumbnail set on the display according to a user input detected by the input interface.

14. The electronic device of claim 1, wherein the one or more computer programs include further computer-executable instructions that, when executed by the one processor individually or collectively, cause the electronic device to one of:
move the first thumbnail set or the second thumbnail set so as to be displayed, on the display, in a location deviated from a main subject, or
display, one the display, an indicator indicating the movement.

15. The electronic device of claim 1, wherein the one or more computer programs include further computer-executable instructions that, when executed by the at least one processor individually or collectively, cause the electronic device to:
when the first thumbnail set is updated with the second thumbnail set, change at least part of the thumbnail views included in the first thumbnail set or add a new thumbnail view.

16. A method of operating performed by an electronic device, the method comprising:
displaying a first screen including a first thumbnail set that includes thumbnail views for different images received from at least two of a plurality of cameras, and a preview of a first image which is one of the different images;
identifying two or more objects to be tracked from one or more of the different images;
obtaining two or more second images that respectively tracks one of the two or more objects via at least one of the plurality of cameras; and
displaying a second screen obtained by updating the first thumbnail set included in the first screen with a second thumbnail set including thumbnail views for the two or more second images.

17. The method of claim 16, wherein each of the two or more objects are identified based on at least one of:
a user input, or
one or more among a motion, a gesture, a sound, or a face.

18. The method of claim 16, wherein, according to a user input to select a thumbnail view in the second thumbnail set, an object, among the two or more objects, to be tracked via the selected thumbnail view is changed.

19. The method of claim 16, wherein, when another object to be tracked is additionally identified from at least one of the different images, a thumbnail view of the another object is added to the second thumbnail set.

20. The method of claim 16, wherein, when an object to be tracked is identified according to a user input to select the first image, thumbnail views that track the object with different zooming rates respectively via the plurality of cameras are displayed in the second thumbnail set in the second screen.

* * * * *